US012804194B2

(12) United States Patent
Choi et al.

(10) Patent No.: US 12,804,194 B2
(45) Date of Patent: Nov. 17, 2026

(54) IMAGE ENCODING METHOD AND APPARATUS AND IMAGE DECODING METHOD AND APPARATUS USING INTERPOLATION BLOCK

(71) Applicant: SAMSUNG ELECTRONICS CO., LTD., Suwon-si (KR)

(72) Inventors: Giyong Choi, Suwon-si (KR); Minwoo Park, Suwon-si (KR); Kwangpyo Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 18/427,172

(22) Filed: Jan. 30, 2024

(65) Prior Publication Data

US 2024/0276011 A1 Aug. 15, 2024

Related U.S. Application Data

(63) Continuation of application No. PCT/KR2024/000921, filed on Jan. 18, 2024.

(30) Foreign Application Priority Data

Feb. 9, 2023 (KR) ........................ 10-2023-0017579
Jun. 9, 2023 (KR) ........................ 10-2023-0074380

(51) Int. Cl.
*H04N 19/176* (2014.01)
*H04N 19/105* (2014.01)
(Continued)

(52) U.S. Cl.
CPC ......... *H04N 19/577* (2014.11); *H04N 19/105* (2014.11); *H04N 19/139* (2014.11);
(Continued)

(58) Field of Classification Search
CPC ............... H04N 19/577; H04N 19/105; H04N 19/139; H04N 19/172; H04N 19/176; H04N 19/52; H04N 19/573
(Continued)

(56) References Cited

U.S. PATENT DOCUMENTS 9,332,273 B2 5/2016 Kim et al.
11,477,477 B2 10/2022 Chen et al.
(Continued)

FOREIGN PATENT DOCUMENTS

CN 111698517 A 9/2020
CN 111711823 B 11/2022
(Continued)

OTHER PUBLICATIONS

Lei Zhao, et al., "EE2-2.5a: Enhanced temporal motion information derivation", Joint Video Experts Team (JVET) of ITU-T SG 16 WP 3 and ISO/IEC JTC 1/SC 29, JVET-AB0118-v1, 28th Meeting, Oct. 20-28, 2022, 4 pages.
(Continued)

*Primary Examiner* — Nguyen T Truong
(74) *Attorney, Agent, or Firm* — Sughrue Mion, PLLC

(57) ABSTRACT

An image decoding method, including: obtaining a motion vector of at least one temporal neighboring block included in at least one of a first reference picture and a second reference picture; deriving one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture; selecting a motion vector candidate for a current interpolation block from among the one or more motion vector candidates; generating the cur-
(Continued)

rent interpolation block using a first block within the first reference picture indicated by the first motion vector included in the selected motion vector candidate and a second block within the second reference picture indicated by the second motion vector included in the selected motion vector candidate; and reconstructing a current block using the current interpolation block.

20 Claims, 19 Drawing Sheets

(51) Int. Cl.

*H04N 19/139* (2014.01)
*H04N 19/172* (2014.01)
*H04N 19/52* (2014.01)
*H04N 19/577* (2014.01)
*H04N 19/573* (2014.01)

(52) U.S. Cl.

CPC ......... *H04N 19/172* (2014.11); *H04N 19/176* (2014.11); *H04N 19/52* (2014.11); *H04N 19/573* (2014.11)

(58) Field of Classification Search

USPC ..................................................... 375/240.02
See application file for complete search history.

(56) References Cited

U.S. PATENT DOCUMENTS

| | | | |
|---|---|---|---|
| 11,539,975 B2 | 12/2022 | Chen et al. | |
| 11,558,633 B2 | 1/2023 | Xiu et al. | |
| 11,601,669 B2 | 3/2023 | Abe et al. | |
| 11,917,193 B2 | 2/2024 | Kim et al. | |
| 12,126,826 B2 | 10/2024 | Lim et al. | |
| 2012/0307908 A1 | 12/2012 | Kitahara et al. | |
| 2013/0329803 A1* | 12/2013 | Kondo | H04N 19/52 375/240.16 |
| 2019/0045211 A1 | 2/2019 | Pohl et al. | |
| 2020/0128271 A1 | 4/2020 | Tanner | |

FOREIGN PATENT DOCUMENTS

| | | |
|---|---|---|
| JP | 2021-016021 A | 2/2021 |
| KR | 10-1881551 B1 | 7/2018 |
| KR | 10-2018-0095489 A | 8/2018 |
| KR | 10-2020-0095463 A | 8/2020 |
| KR | 10-2496619 B1 | 2/2023 |

OTHER PUBLICATIONS

International Search Report (PCT/ISA/210) and Written Opinion (PCT/ISA/237) issued by the International Searching Authority on Apr. 18, 2024 in corresponding International Application No. PCT/KR2024/000921.

* cited by examiner

| | | | | | | | | | |
|---|---|---|---|---|---|---|---|---|---|
| POC | 0 | 1 | 2 | 3 | 4 | 5 | 6 | 7 | 8 |
| Coding order | 0 | 5 | 3 | 6 | 2 | 7 | 4 | 8 | 1 |

FIG. 9

| MOTION VECTOR CANDIDATE | POSITION OF TEMPORAL NEIGHBORING BLOCK | FIRST MOTION VECTOR, SECOND MOTION VECTOR |
|---|---|---|
| 0 | COLOCATED BLOCK | mv_cand0_c, mv_cand1_c |
| 1 | UPPER LEFT BLOCK | mv_cand0_lu, mv_cand1_lu |
| 2 | UPPER BLOCK | mv_cand0_u, mv_cand1_u |
| 3 | UPPER RIGHT BLOCK | mv_cand0_ru, mv_cand1_ru |
| 4 | RIGHT BLOCK | mv_cand0_r, mv_cand1_r |
| ⋮ | ⋮ | ⋮ |
| 8 | LEFT BLOCK | mv_cand0_l, mv_cand1_l |

FIG. 10

| MOTION VECTOR CANDIDATE | POSITION OF TEMPORAL NEIGHBORING BLOCK | FIRST MOTION VECTOR, SECOND MOTION VECTOR |
|---|---|---|
| 0 | COLOCATED BLOCK | mv_cand0_c, mv_cand1_c |
| 1 | UPPER LEFT BLOCK | mv_cand0_lu, mv_cand1_lu |
| 2 | UPPER RIGHT BLOCK | mv_cand0_ru, mv_cand1_ru |
| 3 | RIGHT BLOCK | mv_cand0_r, mv_cand1_r |
| 4 | | 0, 0 |

910

FIG. 11

| | |
|---|---|
| | pic_parameter_set_rbsp( ) { |
| | ⋮ |
| S1110 | **pps_interpolation_pred_flag** |
| S1120 | if(pps_interpolation_pred_flag) |
| S1130 | **pps_interpolation_pic_out_flag** |
| S1140 | if(pps_interpolation_pic_out_flag) |
| S1150 | iinterpolation_pic( ) |

FIG. 12

| | |
|---|---|
| | coding_unit( ) { |
| | ⋮ |
| S1210 | **cu_skip_flag** |
| S1220 | if(cu_skip_flag == 0) |
| S1230 | **pred_mode_flag** |
| S1240 | if(CuPredMode != MODE_INTRA){ |
| S1250 | **interpolation_pred_flag** |
| S1260 | if(interpolation_pred_flag) |
| S1270 | **mv_idx** |

FIG. 13

| | |
|---|---|
| | pic_parameter_set_rbsp( ) { |
| | ⋮ |
| S1310 | **pps_interpolation_pred_mode** |
| S1320 | if(pps_interpolation_pred_mode != 0) |
| S1330 | if(pps_interpolation_pred_mode == 1) |
| S1340 | interpolation_pic( ) |

FIG. 14

| | |
|---|---|
| | coding_unit( ) { |
| | ⋮ |
| S1410 | **cu_skip_flag** |
| S1420 | if(cu_skip_flag == 0) |
| S1430 | **pred_mode_flag** |
| S1440 | if(CuPredMode != MODE_INTRA){ |
| S1450 | if(pps_interpolation_pred_mode == 2) |
| S1460 | **mv_idx** |

IMAGE ENCODING METHOD AND APPARATUS AND IMAGE DECODING METHOD AND APPARATUS USING INTERPOLATION BLOCK

CROSS-REFERENCE TO RELATED APPLICATIONS

This application is a continuation of International Application No. PCT/KR2024/000921, filed on Jan. 18, 2024, in the Korean Intellectual Property Receiving Office, which is based on and claims priority to Korean Provisional Application Number 10-2023-0017579 filed on Feb. 9, 2023, and Korean Patent Application No. 10-2023-0074380 filed on Jun. 9, 2023, in the Korean Intellectual Property Office, the disclosures of which are incorporated by reference herein in their entireties.

BACKGROUND

1. Field

The disclosure relates to the field of image encoding and decoding, and more particularly, to an apparatus and method for encoding and decoding an image using an interpolation block.

2. Description of Related Art

In image encoding and decoding, an image may be split into blocks, and each block may be prediction-encoded and prediction-decoded through inter prediction or intra prediction.

Inter prediction may include removing temporal redundancy between images to compress the images. In inter prediction, blocks of a current image may be predicted using a reference image. A reference block that is most similar to a current block may be searched for within a certain search range within a reference image. The current block may be predicted based on the reference block, and a prediction block generated as a result of prediction may be subtracted from the current block to generate a residual block.

In a codec such as H.264 advanced video coding (AVC) and high efficiency video coding (HEVC), motion vectors of previously encoded blocks adjacent to a current block or blocks included in a previously encoded image may be used as a motion vector predictor of the current block. A motion vector difference between a motion vector of the current block and the motion vector predictor may be signaled to a decoder side through a certain method.

Intra prediction may include removing spatial redundancy within an image to compress the image. Intra prediction may generate a prediction block based on neighboring blocks of a current block according to a prediction mode. Also, a residual block may be generated by subtracting the prediction block from the current block.

A residual block generated through inter prediction or intra prediction may be transformed, quantized, and then transmitted to a decoder. The decoder may inversely quantize and inversely transform the residual block, and reconstruct a current block by combining a prediction block of a current block with the residual block. The decoder may filter the reconstructed current block in certain cases to remove artifacts within the reconstructed current block.

SUMMARY

According to an embodiment of the disclosure, an image decoding method includes obtaining a motion vector of at least one temporal neighboring block included in at least one of a first reference picture and a second reference picture; deriving one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture; selecting a motion vector candidate for a current interpolation block from among the one or more motion vector candidates; generating the current interpolation block using a first block within the first reference picture indicated by the first motion vector included in the selected motion vector candidate and a second block within the second reference picture indicated by the second motion vector included in the selected motion vector candidate; and reconstructing a current block using the current interpolation block.

The at least one temporal neighboring block may include a block located at a same position as the current interpolation block from among blocks included in the at least one of the first reference picture and the second reference picture, and a block adjacent to the block located at the same position.

The selecting of the motion vector candidate for the current interpolation block may be performed based on a difference value between the first block and the second block.

A motion vector candidate having a smallest difference value from among the one or more motion vector candidates may be selected.

The selecting of the motion vector candidate for the current interpolation block may include determining, according to a predetermined order, whether the difference value of each of the one or more motion vector candidates is less than a predetermined value, and a first motion vector candidate that is identified as having the difference value less than the predetermined value may be selected.

The one or more motion vector candidates may include a motion vector candidate that includes a first motion vector and a second motion vector of a neighboring interpolation block that is adjacent to the current interpolation block.

The deriving of the one or more motion vector candidates may include: determining an availability of the at least one temporal neighboring block; and based on the at least one temporal neighboring block being unavailable, determining a first motion vector and a second motion vector for the current interpolation block using an alternative motion vector.

The alternative motion vector may include at least one from among a zero vector, a global vector set for a current interpolation picture including the current interpolation block, and a first motion vector and a second motion vector of a neighboring interpolation block adjacent to the current interpolation block.

The deriving of the one or more motion vector candidates may include: deriving the first motion vector based on a first picture order count (POC) difference between a picture indicated by the motion vector of the at least one temporal neighboring block and a reference picture including the at least one temporal neighboring block, and a second POC difference between a current picture and the first reference picture, and deriving the second motion vector based on the first POC difference, and a third POC difference between the current picture and the second reference picture.

A POC of the first reference picture may be less than a POC of the current picture and may have a smallest difference from the POC of the current picture from among pictures reconstructed before the current picture, and a POC of the second reference picture may be greater than the POC of the current picture and may have a next smallest difference from the POC of the current picture from among the pictures reconstructed before the current picture.

The image decoding method may further include: obtaining, from a bitstream, first information indicating whether a current interpolation picture including the current interpolation block corresponds to a reconstructed current picture; based on the first information indicating that the current interpolation picture corresponds to the reconstructed current picture, generating the current interpolation picture including the current interpolation block using the first reference picture and the second reference picture; and determining the reconstructed current picture based on the current interpolation picture.

The image decoding method may further include: based on the first information indicating that the current interpolation picture does not correspond to the reconstructed current picture, obtaining, from the bitstream, second information indicating whether the current interpolation block is used to reconstruct the current block, and based on the second information indicating that the current interpolation block is used, the current block may be reconstructed using the current interpolation block.

The first information may be obtained from a bitstream for a current picture including the current block, and the second information is obtained from a bitstream for the current block.

According to an embodiment of the disclosure, an image decoding apparatus includes: an interpolation block generator configured to obtain a motion vector of at least one temporal neighboring block included in at least one of a first reference picture and a second reference picture, derive one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture, select a motion vector candidate for a current interpolation block from among the one or more motion vector candidates, and generate the current interpolation block using a first block within the first reference picture indicated by the first motion vector included in the selected motion vector candidate and a second block within the second reference picture indicated by the second motion vector included in the selected motion vector candidate; and a reconstructor configured to reconstruct a current block using the current interpolation block.

According to an embodiment of the disclosure, an image encoding method includes: obtaining a motion vector of at least one temporal neighboring block for a current interpolation block from at least one of a first reference picture or a second reference picture; deriving one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture; selecting a motion vector candidate for the current interpolation block from among the one or more motion vector candidates; generating the current interpolation block using a first block within the first reference picture indicated by the first motion vector included in the selected motion vector candidate and a second block within the second reference picture indicated by the second motion vector included in the selected motion vector candidate; and encoding a current block using the current interpolation block.

The obtaining of the motion vector of the at least one temporal neighboring block may include determining, as the at least one temporal neighboring block, a block located at a same position as the current interpolation block from among blocks included in the at least one of the first reference picture and the second reference picture, and a block adjacent to the block located at the same position.

The image decoding method may further include: generating first information indicating whether a current interpolation picture including the current interpolation block corresponds to a reconstructed current picture; based on the first information indicating that the current interpolation picture does not correspond to the reconstructed current picture, generating second information indicating whether the current interpolation block is used to reconstruct the current block; and generating a bitstream including the first information and the second information.

The first information may be included in a bitstream for a current picture, and the second information is included in a bitstream for the current block.

According to an embodiment of the disclosure, an image encoding apparatus includes: an interpolation block generator configured to: obtain a motion vector of at least one temporal neighboring block for a current interpolation block from at least one of a first reference picture or a second reference picture, derive one or more motion vector candidates from the motion vector of the at least one temporal neighboring block, wherein each of the one or more motion vector candidates includes a first motion vector indicating a block within the first reference picture and a second motion vector indicating a block within the second reference picture, select a motion vector candidate for the current interpolation block from among the one or more motion vector candidates, and generate the current interpolation block using a first block within the first reference picture indicated by the first motion vector included in the selected motion vector candidate and a second block within the second reference picture indicated by the second motion vector included in the selected motion vector candidate; and an encoder configured to encode a current block using the current interpolation block.

According to an embodiment of the disclosure, a non-transitory computer-readable medium stores instructions which, when executed by at least one processor of an image encoding apparatus, cause the image encoding apparatus to: obtain a motion vector of at least one temporal neighboring block for a current interpolation block from at least one of a first reference picture or a second reference picture, derive one or more motion vector candidates from the motion vector of the at least one temporal neighboring block, wherein each of the one or more motion vector candidates includes a first motion vector indicating a block within the first reference picture and a second motion vector indicating a block within the second reference picture, select a motion vector candidate for the current interpolation block from among the one or more motion vector candidates, generate the current interpolation block using a first block within the first reference picture indicated by the first motion vector included in the selected motion vector candidate and a second block within the second reference picture indicated by the second motion vector included in the selected motion vector candidate, and encode a current block using the current interpolation block.

BRIEF DESCRIPTION OF THE DRAWINGS

FIG. 9 is a diagram illustrating a motion vector candidate list, according to an embodiment of the disclosure.

FIG. 10 is a diagram illustrating a motion vector candidate list, according to an embodiment of the disclosure.

FIG. 11 is a diagram illustrating syntax for a current picture, according to an embodiment of the disclosure.

FIG. 12 is a diagram illustrating syntax for a current block, according to an embodiment of the disclosure.

FIG. 13 is a diagram illustrating syntax for a current picture, according to an embodiment of the disclosure.

FIG. 14 is a diagram illustrating syntax for a current block, according to an embodiment of the disclosure.

DETAILED DESCRIPTION

Figure 1:
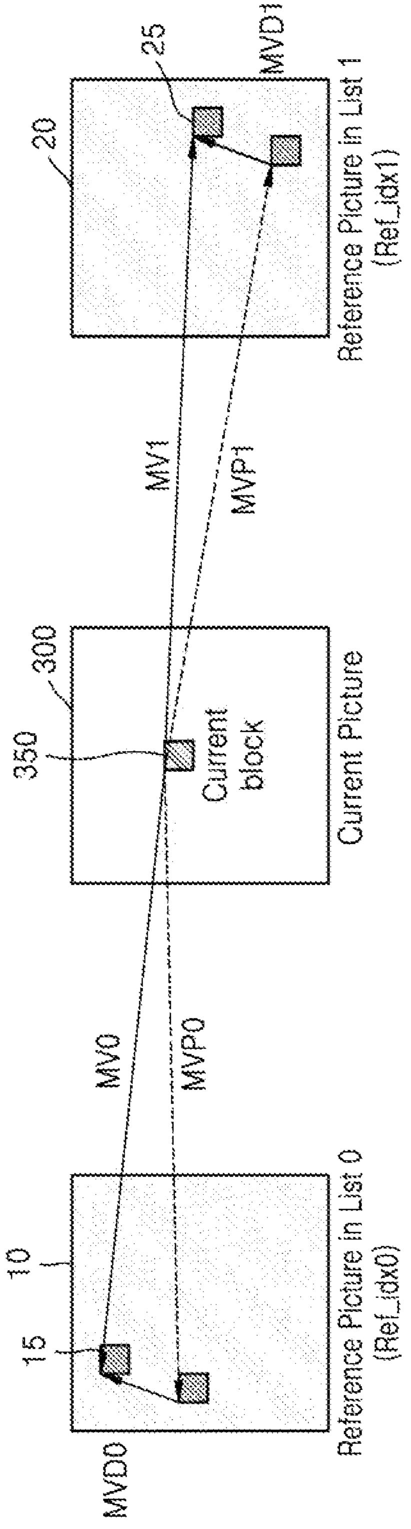
FIG. 1 is a diagram for describing motion information for which signaling is required when bi-prediction is applied to a current block, according to an embodiment of the disclosure.

An image decoding method according to an embodiment of the disclosure may include obtaining a motion vector of at least one temporal neighboring block included in at least one of a first reference picture or a second reference picture.

The image decoding method according to an embodiment of the disclosure may include deriving at least one motion vector candidate from the motion vector of the at least one temporal neighboring block.

In an embodiment of the disclosure, each of the at least one motion vector candidate may include a first motion vector for indicating a block within the first reference picture and a second motion vector for indicating a block within the second reference picture.

The image decoding method according to an embodiment of the disclosure may include selecting a motion vector candidate for a current interpolation block from among the at least one motion vector candidate.

The image decoding method according to an embodiment of the disclosure may include generating the current interpolation block using a first block within the first reference picture indicated by a first motion vector of the selected motion vector candidate and a second block within the second reference picture indicated by a second motion vector of the selected motion vector candidate.

The image decoding method according to an embodiment of the disclosure may include reconstructing a current block using the current interpolation block.

Because the disclosure allows for various changes and numerous examples, particular embodiments of the disclosure are illustrated in the drawings and described in detail in the written description. However, this is not intended to limit the disclosure to particular modes of practice, and all changes, equivalents, and substitutes that do not depart from the spirit and technical scope of various embodiments of the disclosure may be encompassed in the disclosure.

In the description of embodiments, certain detailed explanations of related art are omitted when it is deemed that they may unnecessarily obscure the essence of the disclosure. Also, numbers (e.g., first and second) used in the description of the embodiments are merely identifier codes for distinguishing one element from another.

Throughout the disclosure, the expressions "at least one of a, b or c" and "at least one of a, b, and c" may indicate only a, only b, only c, both a and b, both a and c, both b and c, all of a, b, and c, or variations thereof.

Also, in the disclosure, when elements are described as "connected" or "coupled" to each other, this may mean that the elements may be directly connected or coupled to each other, and may mean that the elements may be connected or coupled to each other with an intervening element therebetween, unless specified otherwise.

In the disclosure, regarding an element represented as a " . . . unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another element.

In the disclosure, an "image" or a "picture" may refer to a still image, frames, a moving image including a plurality of consecutive still images, or a video.

In the disclosure, a "sample" may refer to data that is assigned to a sampling location of an image or a picture and is to be processed. For example, a pixel within a frame of a spatial domain may correspond to a sample. A unit including a plurality of samples may be defined as a block.

In the disclosure, a "first motion vector" may refer to a motion vector for indicating a block within a first reference picture and a "second motion vector" may refer to a motion vector for indicating a block within a second reference picture from among the first reference picture and the second reference picture for a current block or a current picture.

An image encoding and decoding process may include inter prediction for encoding and decoding a current block using a previous picture by considering a relationship between pictures. In this case, from among pictures encoded/decoded before a current picture, a picture referenced by the current block or the current picture may be referred to as a reference picture.

Inter prediction may include uni-prediction and bi-prediction. Uni-prediction may refer to a case where inter prediction is performed on a current block based on one reference picture, and bi-prediction may refer to a case where inter prediction is performed on a current block based on two reference pictures.

In an embodiment of the disclosure, uni-prediction may be referred to as uni-directional prediction, and bi-prediction may be referred to as bi-directional prediction.

When a current block is bi-predicted, the amount of information which an encoder should transmit (or signal) to a decoder may increase compared to uni-prediction. Examples of information for which signaling is used when a current block is bi-predicted are described with reference to FIG. 1.

FIG. 1 is a diagram for describing motion information for which signaling is used when bi-prediction is applied to a current block, according to an embodiment of the disclosure.

A current block 350 may be uni-predicted using any one of a reference picture 10 included in list 0 and a reference picture 20 included in list 1, or may be bi-predicted using both the reference picture 10 included in list 0 and the reference picture 20 included in list 1. Here, a list may include a set of one more pictures encoded/decoded before a current picture 300, and may be referred to as a reference picture list.

An encoder may determine the reference picture 10 from list 0 and may determine the reference picture 20 from list 1. The encoder may transmit a reference picture index ref_idx0 of list 0 and a reference picture index ref_idx1 of list 1 to a decoder.

The decoder may select the reference picture 10 from among pictures included in list 0 using the reference picture index ref_idx0, and may select the reference picture 20 from among pictures included in list 1 using the reference picture index ref_idx1.

The encoder may select a reference block 15 for the current block 350 within the reference picture 10 of list 0, and may determine a motion vector MV0 indicating the selected reference block 15. Also, the encoder may select a reference block 25 for the current block 350 within the reference picture 20 of list 1, and may determine a motion vector MV1 indicating the selected reference block 25.

The encoder may predict the motion vectors MV0 and MV1 using a motion vector of a block encoded before the current block 350 to encode the motion vectors MV0 and MV1. In this case, the block encoded before the current block 350 may include a temporal neighboring block included in a picture encoded before the current picture 300 and a spatial neighboring block adjacent to the current block 350 within the current picture 300.

The encoder may establish a motion vector predictor candidate list using the motion vector of the block encoded before the current block 350. The encoder may select a motion vector predictor MVP0 for list 0 used to predict the motion vector MV0 for list 0 in the motion vector predictor candidate list and may select a motion vector predictor MVP1 for list 1 used to predict the motion vector MV1 for list 1 in the motion vector predictor candidate list.

The encoder may transmit, to the decoder, information (e.g., a flag or index) indicating the motion vector predictor MVP0 for list 0, information indicating a motion vector difference MVD0 for list 0 corresponding to a difference between the motion vector predictor MVP0 for list 0 and the motion vector MV0 for list 0, information (e.g., a flag or index) indicating the motion vector predictor MVP1 for list 1, and information indicating a motion vector difference MVD1 for list 1 corresponding to a difference between the motion vector predictor MVP1 for list 1 and the motion vector MV1 for list 1.

The decoder may select the motion vector predictor MVP0 for list 0 in the motion vector predictor candidate list from the information indicating the motion vector predictor MVP0 for list 0 received from the encoder, and may determine the motion vector MV0 for list 0 by combining the motion vector predictor MVP0 for list 0 with the motion vector difference MVD0 for list 0. The decoder may select the motion vector predictor MVP1 for list 1 in the motion vector predictor candidate list from the information indicating the motion vector predictor MVP1 for list 1 received from the encoder, and may determine the motion vector MV1 for list 1 by combining the motion vector predictor MVP1 for list 1 with the motion vector difference MVD1 for list 1.

The decoder may reconstruct the current block 350 using a result of combining the reference block 15 within the reference picture 10 of list 0 indicated by the motion vector MV0 for list 0 with the reference block 25 within the reference picture 20 of list 1 indicated by the motion vector MV1 for list 1.

Referring to FIG. 1, when the current block 350 is bi-predicted, information transmitted from the encoder to the decoder may include the information ref_idx0 indicating the reference picture 10 within list 0, the information indicating the motion vector predictor MVP0 for list 0, the information indicating the motion vector difference MVD0 for list 0, the information ref_idx1 indicating the reference picture 20 within list 1, the information indicating the motion vector predictor MVP1 for list 1, and the information indicating the motion vector difference MVD1 for list 1.

Because one reference picture is used when the current block 350 is uni-predicted, information transmitted from the encoder to the decoder may include the information ref_idx0 indicating the reference picture 10 within list 0, the information indicating the motion vector predictor MVP0 for list 0, and the information indicating the motion vector difference MVD0 for list 0, or instead may include the information ref_idx1 indicating the reference picture 20 within list 1, the information indicating the motion vector predictor MVP1 for list 1, and the information indicating the motion vector difference MVD1 for list 1.

Accordingly, when the current block 350 is bi-predicted, there may be six types of information that should be signaled from the encoder to the decoder, which may increase a bit rate of a bitstream in comparison with uni-prediction.

According to an embodiment of the disclosure, for the current block 350 that is bi-predicted, the encoder and the decoder may generate a current interpolation picture corresponding to the current picture 300 (or a current interpolation block corresponding to the current block 350) using a first reference picture and a second reference picture, and may use the current interpolation picture (or the current interpolation block) as a reference picture (or a reference block), thereby reducing the number of information used for bi-prediction.

In an embodiment of the disclosure, "interpolation" may be distinguished from an interpolation process of generating sub-pixels from integer pixels. In an embodiment of the disclosure, "interpolation" may refer to a process of newly generating a picture or a block using two reference pictures.

Figure 2:
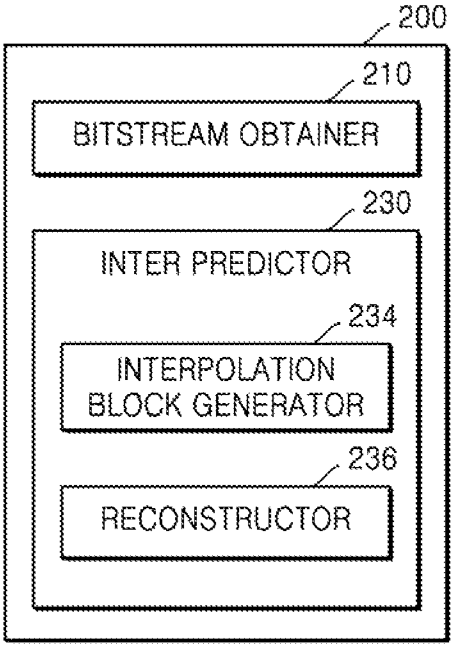
FIG. 2 is a block diagram illustrating a configuration of an image decoding apparatus, according to an embodiment of the disclosure.

FIG. 2 is a diagram illustrating a configuration of an image decoding apparatus, according to an embodiment of the disclosure.

Referring to FIG. 2, an image decoding apparatus 200 may include a bitstream obtainer 210 and an inter predictor 230.

The bitstream obtainer 210 and the inter predictor 230 according to an embodiment of the disclosure may be implemented as, by, or using at least one processor. In an embodiment of the disclosure, the bitstream obtainer 210 and the inter predictor 230 may operate according to instructions stored in a memory.

The image decoding apparatus 200 may include the memory in which input/output data of the bitstream obtainer 210 and the inter predictor 230 are stored. Also, the image decoding apparatus 200 may include a memory controller for controlling data input/output to/from the memory.

The bitstream obtainer 210 may obtain a bitstream generated as a result of encoding a picture. The bitstream may include an encoding result for the current block 350.

In an embodiment of the disclosure, the bitstream obtainer 210 may receive the bitstream from an image encoding apparatus through a network.

In an embodiment of the disclosure, the bitstream obtainer 210 may obtain the bitstream from a data storage medium including at least one of a magnetic medium such as a hard disk, a floppy disk, and a magnetic tape, an optical recording medium such as a compact disc read-only memory (CD-ROM) and a digital versatile disc (DVD), or a magneto-optical medium such as a floptical disk.

The bitstream obtainer 210 may obtain syntax elements for decoding of the picture from the bitstream. Values corresponding to the syntax elements may be included in the bitstream according to a hierarchical structure of the picture.

The bitstream obtainer 210 may obtain the syntax elements by entropy decoding bins included in the bitstream.

The bitstream may include information about a prediction mode of the current block 350 within the current picture 300. The current block 350 may be a largest coding unit, a coding unit, or a transform unit split from the current picture 300 to be decoded.

The prediction mode of the current block 350 may include an intra prediction mode or an inter prediction mode. When the prediction mode of the current block 350 is an inter prediction mode, the bitstream obtainer 210 may obtain information used to inter predict the current block 350 from the bitstream.

In an embodiment of the disclosure, the information used to inter predict the current block 350 may include some or all of the following information:

i) information indicating whether an interpolation prediction mode is applicable to the current picture 300 ii) when the interpolation prediction mode is applicable to the current picture 300, information indicating whether a current interpolation picture corresponds to a reconstructed current picture iii) information indicating whether the interpolation prediction mode is applied to the current block 350 iv) when the interpolation prediction mode is applied to the current block 350, information indicating a motion vector for indicating a current interpolation block within the current interpolation picture v) information indicating a first reference picture and a second reference picture for the current picture 300 or the current block 350 vi) information indicating a motion vector candidate for the current interpolation block from among motion vector candidates included in a motion vector candidate list vii) residual information corresponding to a difference between the current block and the current interpolation block (or a reference block of the current block)

viii) residual information corresponding to a difference between the reconstructed current picture and the current interpolation picture.

The above information is an example, and the information used to inter predict the current block 350 may further include information in addition to the above information. Examples of information obtained from the bitstream in relation to the interpolation prediction mode are described below with reference to FIGS. 11 to 14.

In an embodiment of the disclosure, an interpolation prediction mode may refer to a mode in which the current picture 300 or the current block 350 is encoded and/or decoded based on a current interpolation picture or a current interpolation block generated using a first reference picture and a second reference picture.

In an embodiment of the disclosure, when the interpolation prediction mode using the current interpolation picture as a reference picture is applied to the current block 350, the inter predictor 230 may generate the current interpolation block based on the first reference picture and the second reference picture for the current block 350 or the current picture 300, and may reconstruct the current block 350 using the current interpolation block.

In an embodiment of the disclosure, a current interpolation block may refer to an interpolation block used to reconstruct the current block 350 from among interpolation blocks within the current interpolation picture.

For example, an interpolation block including a reference block indicated by a motion vector of the current block 350 within the current interpolation picture may correspond to the current interpolation block.

Also, for example, an interpolation block including a reference block located at the same position as the current block 350 from among interpolation blocks within the current interpolation picture may correspond to the current interpolation block.

In an embodiment of the disclosure, when the current interpolation picture corresponds to a reconstructed current picture, the inter predictor 230 may generate the current interpolation picture including multiple interpolation blocks using the first reference picture and the second reference picture, and may reconstruct the current picture 300 using the current interpolation picture. For example, the inter predictor 230 may determine the current interpolation picture as a reconstructed current picture. The reconstructed current picture may be output for display through filtering when necessary.

Referring to FIG. 2, the inter predictor 230 may include an interpolation block generator 234 and a reconstructor 236.

The interpolation block generator 234 may identify a position of the current interpolation block that needs to be generated within the current interpolation picture.

In an embodiment of the disclosure, the interpolation block generator 234 may identify an interpolation block located at the same position as the current block 350 from among interpolation blocks within the current interpolation picture as the current interpolation block.

In an embodiment of the disclosure, the interpolation block generator 234 may identify the current interpolation block by applying a motion vector of the current block 350 to the current block 350.

In an embodiment of the disclosure, the motion vector of the current block 350 may be determined based on information obtained from the bitstream.

In an embodiment of the disclosure, the interpolation block generator 234 may use a neighboring block of the current block 350 to obtain the motion vector of the current block 350. The neighboring block of the current block 350 may include a temporal neighboring block and/or a spatial neighboring block.

In an embodiment of the disclosure, the temporal neighboring block may include a block included in a picture reconstructed before the current picture 300, and the spatial neighboring block may include a block adjacent to the current block 350 within the current picture 300.

Figure 3:
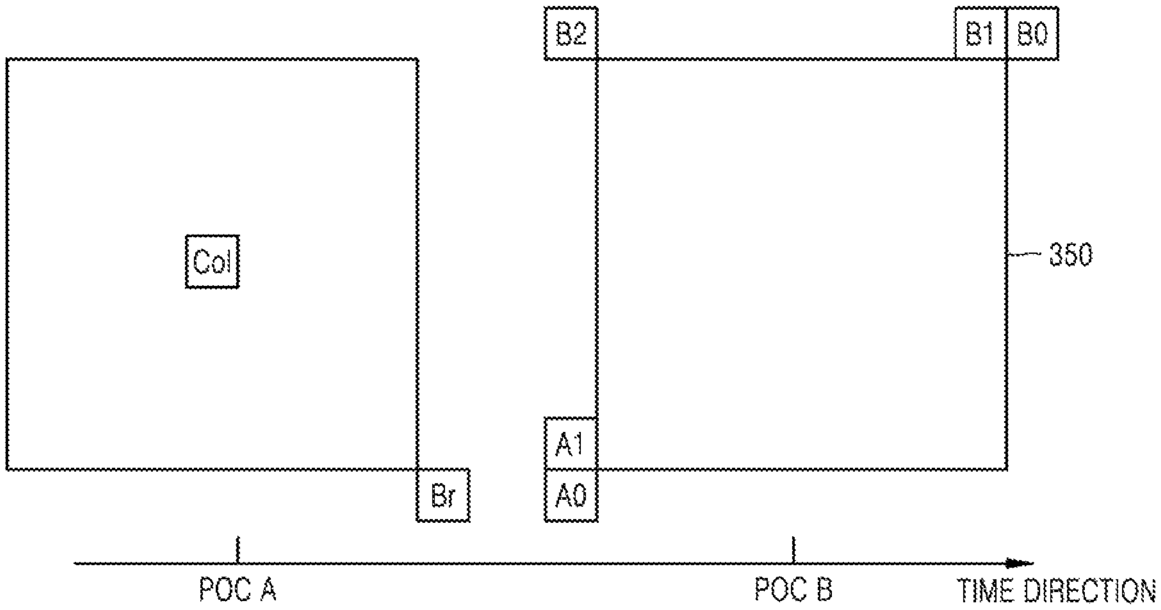
FIG. 3 is a diagram illustrating a temporal neighboring block and a spatial neighboring block of a current block, according to an embodiment of the disclosure.

FIG. 3 is a diagram illustrating a temporal neighboring block and a spatial neighboring block of a current block, according to an embodiment of the disclosure.

Referring to FIG. 3, a temporal neighboring block may include at least one of a block Col located at the same position as the current block 350 within a picture having a picture order count (POC) (e.g., POC A) which is different from a POC (e.g., POC B) of the current block 350, and a block Br spatially adjacent to the block Col of the same position. A POC may refer to a value assigned to a picture according to an output order.

The block Br may be located on a lower right side of the block Col located at the same position as the current block 350. The block Col located at the same point as the current block 350 may be a block including a pixel corresponding to a center pixel within the current block 350 from among pixels within the picture having the POC A.

A spatial neighboring block may include at least one of a lower left corner block A0, a lower left block A1, an upper right corner block B0, an upper right block B1, or an upper left corner block B2.

The temporal neighboring block and the spatial neighboring block illustrated in FIG. 3 are an example, and positions and numbers of the temporal neighboring block and the spatial neighboring block may be changed in various ways.

Referring again to FIG. 2, the interpolation block generator 234 may establish a motion vector predictor candidate list using a motion vector of the neighboring block of the current block 350.

The interpolation block generator 234 may obtain information (e.g., a flag or index) indicating a motion vector predictor of the current block 350 from the bitstream, and may select the motion vector predictor of the current block 350 in the motion vector predictor candidate list using the obtained information.

The interpolation block generator 234 may obtain the motion vector of the current block 350 by combining the motion vector predictor of the current block 350 with a motion vector difference obtained from the bitstream.

In an embodiment of the disclosure, the interpolation block generator 234 may determine the motion vector predictor as the motion vector of the current block 350.

In an embodiment of the disclosure, the interpolation block generator 234 may determine, without obtaining from the bitstream, a motion vector having a pre-agreed or predetermined value between the image decoding apparatus 200 and the image encoding apparatus as the motion vector of the current block 350. For example, the interpolation block generator 234 may determine a vector having a pre-agreed or predetermined component value, for example, a zero vector, as the motion vector of the current block 350. A zero vector may refer to a vector in which both a component value in a width direction and a component value in a height direction are 0.

In an embodiment of the disclosure, when the motion vector of the current block 350 is obtained, the interpolation block generator 234 may identify a position of the current interpolation block based on the motion vector of the current block 350.

The interpolation block generator 234 may determine a first reference picture and a second reference picture for the current block 350 or the current picture 300 from among pictures reconstructed before the current picture 300.

In an embodiment of the disclosure, the interpolation block generator 234 may obtain information (e.g., a flag or index) indicating the first reference picture and information (e.g., a flag or index) indicating the second reference picture from the bitstream, and may determine the first reference picture and the second reference picture from among pictures reconstructed before the current picture 300 based on the obtained information.

In an embodiment of the disclosure, the interpolation block generator 234 may determine the first reference picture from among pictures included in list 0 based on the information indicating the first reference picture, and may determine the second reference picture from among pictures included in list 1 based on the information indicating the second reference picture.

In an embodiment of the disclosure, the interpolation block generator 234 may determine the first reference picture and the second reference picture according to a predetermined method without obtaining the information indicating the first reference picture and the information indicating the second reference picture from the bitstream.

For example, the interpolation block generator 234 may determine the first reference picture and the second reference picture based on a result of comparing a POC of the current picture 300 with POCs of pictures reconstructed before the current picture 300.

For example, the interpolation block generator 234 may select a picture having a POC that is less than a POC of the current picture 300 and has a smallest difference from the POC of the current picture 300 from among pictures reconstructed before the current picture 300 as the first reference picture. Also, the interpolation block generator 234 may select a picture having a POC that is greater than a POC of the current picture 300 and has a smallest difference from the POC of the current picture 300 from among pictures reconstructed before the current picture 300 as the second reference picture.

When the interpolation block generator 234 determines the first reference picture and the second reference picture according to the predetermined method, because the information indicating the first reference picture and the second reference picture does not need to be included in the bitstream, a bit rate of the bitstream may be reduced.

The interpolation block generator 234 may generate the current interpolation block used to reconstruct the current block 350 based on the first reference picture and the second reference picture.

The interpolation block generator 234 may divide the current interpolation picture into interpolation blocks of predetermined sizes to generate a current interpolation block, and may identify a position of the current interpolation block required to reconstruct the current block 350.

As described above, a position of the current interpolation block may be identified as the same position as a position of the current block 350, or may be identified as a position to which the motion vector of the current block 350 is applied on the position of the current block 350.

In an embodiment of the disclosure, when the position of the current interpolation block is identified, the interpolation block generator 234 may determine a first motion vector and a second motion vector for the current interpolation block, and may generate the current interpolation block using a first block within in the first reference picture indicated by the first motion vector and a second block within the second reference picture indicated by the second motion vector.

For example, the interpolation block generator 234 may determine average values of sample values of the first block within the first reference picture and sample values of the second block within the second reference picture, and may generate the current interpolation block having the determined average values as sample values.

The reconstructor 236 may reconstruct the current block 350 using the current interpolation block.

In an embodiment of the disclosure, the current interpolation block may be determined as a reconstructed current block. In an embodiment of the disclosure, the reconstructor 236 may reconstruct the current block 350 by combining a residual sample value obtained from the bitstream with a sample value of the current interpolation block.

In an embodiment of the disclosure, the reconstructor 236 may reconstruct the current block 350 using a reference block corresponding to a partial area of the current interpolation block.

Hereinafter, examples of a process of reconstructing the current block 350 according to the current interpolation block are described with reference to FIGS. 4 to 14.

Figure 4:
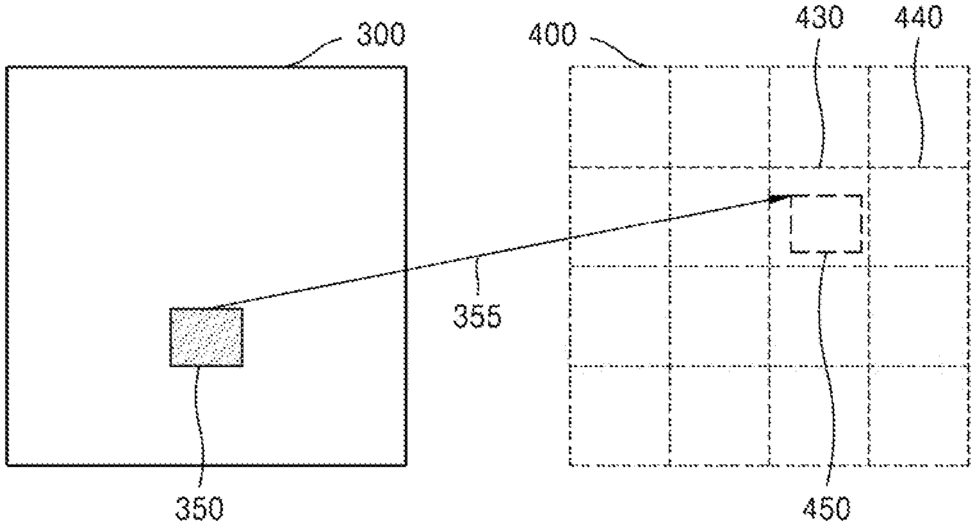
FIG. 4 is a diagram for describing a method of reconstructing a current block using a current interpolation block, according to an embodiment of the disclosure.

FIG. 4 is a diagram for describing a method of reconstructing a current block using a current interpolation block, according to an embodiment of the disclosure.

In an embodiment of the disclosure, when a motion vector 355 of the current block 350 is obtained by the interpolation block generator 234, the interpolation block generator 234 may identify a position of a reference block 450 indicated by the motion vector 355 within a current interpolation picture 400.

For example, the interpolation block generator 234 may identify a position of a certain sample (e.g., an upper left sample) of the reference block 450 by applying the motion vector 355 to a position of a certain sample (e.g., an upper left sample) of the current block 350, and may identify the reference block 450 having the same size as the current block 350 based on the certain sample.

In an embodiment of the disclosure, the interpolation block generator 234 may identify the reference block 450 located at the same position as the current block 350 within the current interpolation picture 400.

As described below, when an image encoding apparatus splits the current interpolation picture 400 into interpolation blocks of predetermined sizes and generates each interpolation block using a first reference picture and a second reference picture, the interpolation block generator 234 may also split the current interpolation picture 400 into interpolation blocks of predetermined sizes. The interpolation block generator 234 may determine an interpolation block including the reference block 450 from among interpolation blocks within the current interpolation picture 400 as a current interpolation block 430.

Although the reference block 450 is included as a part in the current interpolation block 430 in FIG. 4, a size of the reference block 450 may be the same as a size of the current interpolation block 430. That is, the reference block 450 may correspond to the current interpolation block 430.

When the current interpolation block 430 is identified, the interpolation block generator 234 may generate the current interpolation block 430 using a first reference picture and a second reference picture, and the reconstructor 236 may reconstruct the current block 350 using the current interpolation block 430.

In an embodiment of the disclosure, when a size of the current interpolation block 430 is greater than that of the current bock 350, the reconstructor 236 may reconstruct the current block 350 using a partial area within the current interpolation block 430, for example, samples of the reference block 450.

In an embodiment of the disclosure, when the reference block 450 is included in two current interpolation blocks 430 and 440, for example when a partial area within one current interpolation block 430 and a partial area within the other current interpolation block 440 are included in the reference block 450, the interpolation block generator 234 may generate the two current interpolation blocks 430 and 440 using a first reference picture and a second reference picture, and may reconstruct the current block 350 from the reference block 450 included in the two current interpolation blocks 430 and 440.

In an embodiment of the disclosure, a method of selecting a first reference picture and a second reference picture used to generate the current interpolation block 430 is described below.

Figure 5:
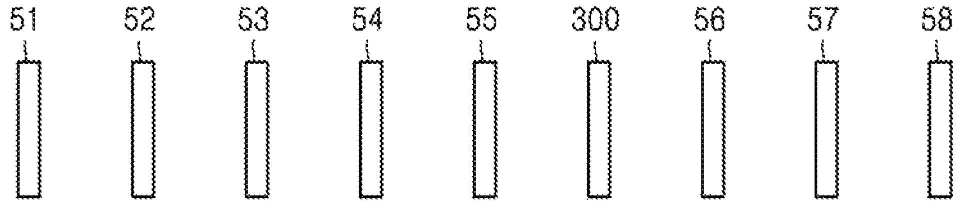
FIG. 5 is a diagram for describing a method of selecting a first reference picture and a second reference picture, according to an embodiment of the disclosure.

FIG. 5 is a diagram for describing a method of selecting a first reference picture and a second reference picture, according to an embodiment of the disclosure.

Pictures 51, 52, 53, 54, 55, 56, 57, 58, and 300 illustrated in FIG. 5 may be included in a group of pictures (GOP).

In an embodiment of the disclosure, the interpolation block generator 234 may select a first reference picture and a second reference picture from among pictures decoded before the current picture 300.

When a certain picture is decoded before the current picture 300, it may mean that the certain picture has a coding order that is earlier than a coding order of the current picture 300.

As shown in FIG. 5, when a coding order of the current picture 300 is 7, a first reference picture and a second reference picture may be selected from among the pictures 51, 52, 53, 54, 55, 56, and 58 having coding orders of 1 to 6. Because a coding order of the picture 57 is 8, the picture may not correspond to a picture decoded before the current picture 300.

In an embodiment of the disclosure, the interpolation block generator 234 may select pictures having POCs with a smallest difference from a POC of the current picture 300 as a first reference picture and a second reference picture.

For example, in FIG. 5, when a POC of the current picture 300 is 5, from among the pictures 51, 52, 53, 54, 55, 56, and 58 decoded before the current picture 300, the picture 55 having a POC of 4 and the picture 56 having a POC of 6 which have a smallest difference from the POC of 5 may be respectively selected as a first reference picture and a second reference picture.

In an embodiment of the disclosure, the interpolation block generator 234 may select the picture 55 having a POC that is less than a POC of the current picture 300 and has a smallest difference from the POC of the current picture 300 from among the pictures 51, 52, 53, 54, 55, 56, and 58 reconstructed before the current picture 300 as a first reference picture. Also, the interpolation block generator 234 may select the picture 56 having a POC that is greater than the POC of the current picture 300 and has a smallest difference from the POC of the current picture 300 from among the pictures 51, 52, 53, 54, 55, 56, and 58 as a second reference picture.

In an embodiment of the disclosure, when the interpolation block generator 234 selects a first reference picture and a second reference picture from among the pictures 51, 52, 53, 54, 55, 56, and 58 decoded before the current picture 300, an intra-predicted picture may be excluded from consideration. An intra-predicted picture may refer to a picture in which all blocks within the picture are intra-predicted. This is because, when all blocks within a picture are intra-predicted, none of the blocks within the picture have motion vectors.

For example, when the picture 55 having a POC of 4 corresponds to an intra-predicted picture, the interpolation block generator 234 may exclude the intra-predicted picture 55, and may select a first reference picture and a second reference picture from among the pictures 51, 52, 53, 54, 56, and 58 decoded before the current picture 300.

In an embodiment of the disclosure, the interpolation block generator 234 may select a first reference picture from among the pictures 51, 52, 53, 54, 55, 56, and 58 decoded before the current picture 300 according to information indicating a first reference picture obtained from a bitstream. Also, the interpolation block generator 234 may select a second reference picture from among the pictures 51, 52, 53, 54, 55, 56, and 58 decoded before the current picture 300 according to information indicating a second reference picture obtained from the bitstream.

In an embodiment of the disclosure, when decoding of the current picture 300 is performed with low delay, the interpolation block generator 234 may select two pictures having a smallest POC difference from the current picture 300 from among pictures decoded before the current picture 300 as a first reference picture and a second reference picture. When decoding of the current picture 300 is performed with low delay, this may mean that only a picture having a POC less than a POC of the current picture 300 from among pictures decoded before the current picture 300 is used to decode the current picture 300.

The interpolation block generator 234 may generate the current interpolation block 430 using the selected first reference picture and the selected second reference picture.

Figure 6:
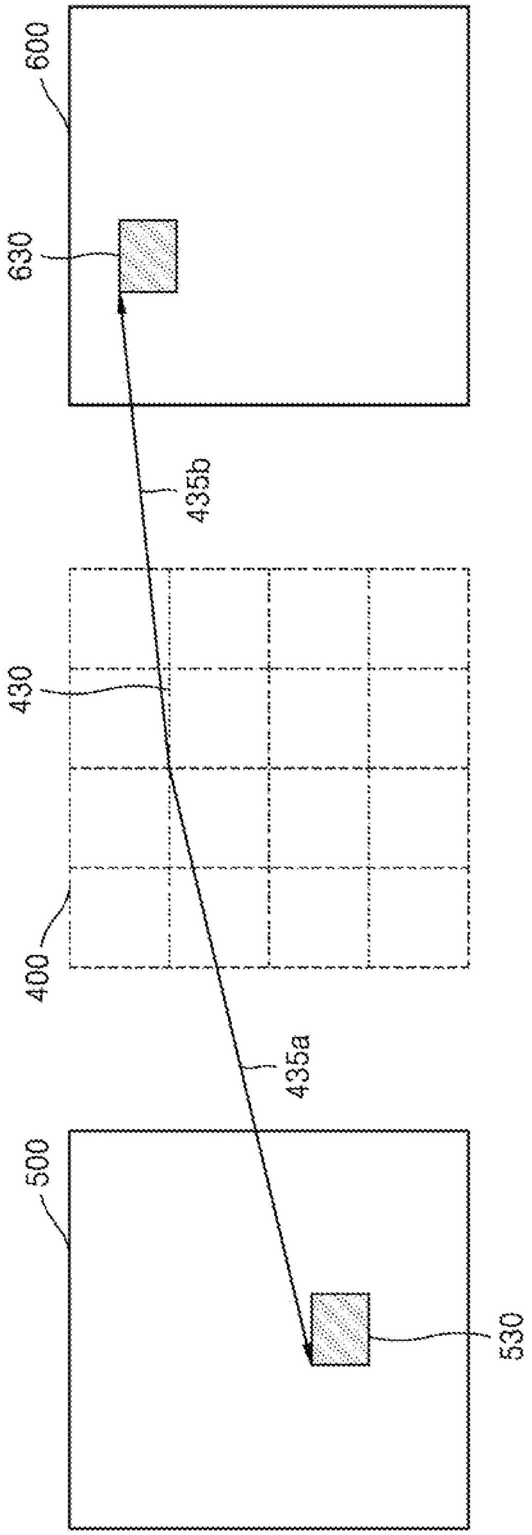
FIG. 6 is a diagram for describing a method of generating a current interpolation block, according to an embodiment of the disclosure.

FIG. 6 is a diagram for describing a method of generating the current interpolation block 430, according to an embodiment of the disclosure.

In an embodiment of the disclosure, the current interpolation block 430 may be generated using a first block 530 within a first reference picture 500 and a second block 630 within a second reference picture 600. For example, the current interpolation block 430 may include average values of sample values of the first block 530 and sample values of the second block 630 as sample values.

The first block 530 within the first reference picture 500 may be identified by a first motion vector 435*a* of the current interpolation block 430, and the second block 630 within the second reference picture 600 may be identified by a second motion vector 435*b* of the current interpolation block 430.

In an embodiment of the disclosure, the interpolation block generator 234 may identify the first block 530 within the first reference picture 500 by applying the first motion vector 435*a* to a position of a certain sample (e.g., an upper left sample) within the current interpolation block 430, and may identify the second block 630 within the second reference picture 600 by applying the second motion vector 435*b* to a position of a certain sample within the current interpolation block 430.

The first motion vector 435*a* and the second motion vector 435*b* of the current interpolation block 430 may be derived from a motion vector of a temporal neighboring block temporally related to the current interpolation block 430, an example of which is described below with reference to FIG. 7.

Figure 7:
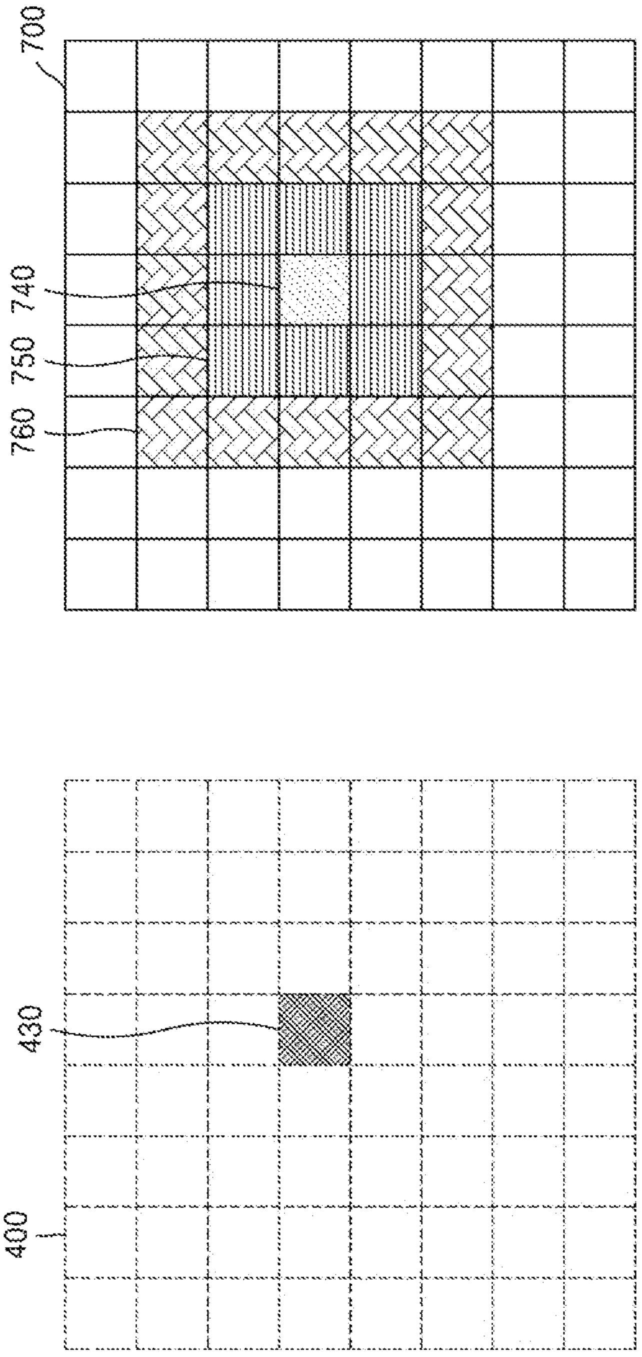
FIG. 7 is a diagram illustrating a temporal neighboring block of a current interpolation block, according to an embodiment of the disclosure.

FIG. 7 is a diagram illustrating a temporal neighboring block for a current interpolation block, according to an embodiment of the disclosure.

In an embodiment of the disclosure, the interpolation block generator 234 may determine at least one temporal neighboring block for the current interpolation block 430 from at least one of the first reference picture 500 or the second reference picture 600.

In an embodiment of the disclosure, the interpolation block generator 234 may determine a temporal neighboring block from both the first reference picture 500 and the second reference picture 600.

In an embodiment of the disclosure, the interpolation block generator 234 may select one reference picture for determining a temporal neighboring block from among the first reference picture 500 and the second reference picture 600.

In an embodiment of the disclosure, the interpolation block generator 234 may select a reference picture having a smallest POC difference from the current picture 300 from among the first reference picture 500 and the second reference picture 600, and may determine a temporal neighboring block from the selected reference picture.

In an embodiment of the disclosure, when a POC difference between the first reference picture 500 and the current picture 300 is the same as a POC difference between the second reference picture 600 and the current picture 300, the interpolation block generator 234 may select a reference picture having a smaller coding order difference from the current picture 300 from among the first reference picture 500 and the second reference picture 600 for determining a temporal neighboring block.

In an embodiment of the disclosure, when a POC difference between the first reference picture 500 and the current picture 300 is the same as a POC difference between the second reference picture 600 and the current picture 300 and a coding order difference between the first reference picture 500 and the current picture 300 is the same as a coding order difference between the second reference picture 600 and the current picture 300, the interpolation block generator 234 may select a reference picture having a later (or earlier) coding order from among the first reference picture 500 and the second reference picture 600 to determine a temporal neighboring block.

In an embodiment of the disclosure, the interpolation block generator 234 may select a third reference picture for determining a temporal neighboring block from among pictures decoded before the current picture 300. In this case, one of the first reference picture 500 and the second reference picture 600 may be selected as a third reference picture.

In an embodiment of the disclosure, a picture other than the first reference picture 500 and the second reference picture 600 from among pictures decoded before the current picture 300 may be selected as a third reference picture.

In an embodiment of the disclosure, when a third reference picture is selected, POCs and/or coding orders of pictures decoded before the current picture 300 may be considered.

In an embodiment of the disclosure, the interpolation block generator 234 may select a picture having a smallest POC difference from the current picture 300 from among pictures decoded before the current picture 300 as a third reference picture.

In an embodiment of the disclosure, when the number of pictures having a smallest POC difference from the current picture 300 is m (where m is a natural number greater than 1), the interpolation block generator 234 may select a picture having a POC greater than (or less than) a POC of the current picture 300 from among the m pictures as a third reference picture.

In an embodiment of the disclosure, when the number of pictures having a smallest POC difference from the current picture 300 is m (where m is a natural number greater than 1), the interpolation block generator 234 may select a picture having a smallest coding order difference from the current picture 300 from among the m pictures as a third reference picture.

In an embodiment of the disclosure, when the number of pictures having a smallest POC difference from the current picture 300 is m (where m is a natural number greater than 1) and coding order differences between the current picture 300 and the m pictures are the same, the interpolation block generator 234 may select a picture having a later (or earlier) coding order from among the m pictures as a third reference picture.

In an embodiment of the disclosure, the interpolation block generator 234 may allocate priority orders to pictures decoded before the current picture 300, and may determine temporal neighboring blocks from the pictures according to the priority orders. Priority orders allocated to the pictures decoded before the current picture may be determined according to POCs and/or coding orders of the pictures. For example, priority orders may be allocated in an order in which POC differences from the current picture 300 are smaller, and when there are a plurality of pictures having the same POC difference from the current picture 300, priority orders may be allocated to pictures in an order in which coding order differences from the current picture 300 are smaller.

In an embodiment of the disclosure, at least one temporal neighboring block may include a block located at a predetermined position from among blocks included in a reference picture (the first reference picture 500, the second reference picture 600, and/or the third reference picture).

In an embodiment of the disclosure, at least one temporal neighboring block may include a block located at the same position as the current interpolation block 430 from among blocks included in a reference picture.

In an embodiment of the disclosure, at least one temporal neighboring block may include at least one block adjacent to a block located at the same position as the current interpolation block 430 from among blocks included in a reference picture.

A reference picture 700 illustrated in FIG. 7 may be the first reference picture 500, the second reference picture 600, or the third reference picture.

Referring to FIG. 7, a temporal neighboring block may include a block 740 located at the same position as the current interpolation block 430 and eight blocks 750 adjacent to the block 740 located at the same position. Also, the temporal neighboring block may include 16 blocks 760 adjacent to the eight blocks 750 adjacent to the block 740 located at the same position.

Although FIG. 7 illustrates 25 blocks as temporal neighboring blocks, the position and the number of temporal neighboring blocks of FIG. 7 are an example. For example, a temporal neighboring block may include only some of the 25 blocks illustrated in FIG. 7, or may further include a block in addition to the 25 blocks illustrated in FIG. 7.

The interpolation block generator 234 may establish a motion vector candidate list for the current interpolation block 430 using a motion vector of at least one temporal neighboring block.

In an embodiment of the disclosure, each of at least one motion vector candidate included in the motion vector candidate list may include a first motion vector for indicating a block within the first reference picture 500 and a second motion vector for indicating a block within the second reference picture 600. In embodiments, the at least one motion vector candidate may be referred to as one or more motion vector candidates.

In an embodiment of the disclosure, the motion vector candidate list may further include a first motion vector and a second motion vector of a neighboring interpolation block generated before the current interpolation block 430 as motion vector candidates. In this case, in order to determine the neighboring interpolation block having the first motion vector and the second motion vector, breadth-first search (BFS) may be used.

In an embodiment of the disclosure, when the interpolation block generator 234 establishes the motion vector candidate list, the interpolation block generator 234 may determine availability of at least one temporal neighboring block and may generate a motion vector candidate using a motion vector of a temporal neighboring block determined to be available. For example, when an intra prediction mode is applied to one temporal neighboring block, the interpolation block generator 234 may determine that the temporal neighboring block is unavailable. Also, for example, when a motion vector of one temporal neighboring block is the same as a motion vector of another temporal neighboring block, the interpolation block generator 234 may determine that the one temporal neighboring block is unavailable.

In an embodiment of the disclosure, the interpolation block generator 234 may determine availability of each of at least one temporal neighboring block according to a predetermined scan order, and may sequentially generate motion vector candidates from motion vectors of temporal neighboring blocks determined to be available.

In an embodiment of the disclosure, the scan order of the at least one temporal neighboring block may be as follows:

i) $1^{st}$ priority level: block 740 located at the same position as the current interpolation block 430 ii) $2^{nd}$ priority level: left block of the block 740 having the $1^{st}$ priority level iii) $3^{rd}$ priority level: upper block of the block 740 having the $1^{st}$ priority level iv) $4^{th}$ priority level: right block of the block 740 having the $1^{st}$ priority level v) $5^{th}$ priority level: lower block of the block 740 having the $1^{st}$ priority level vi) $6^{th}$ priority level: upper left block, upper right block, lower right block, or lower left block of the block 740 having the $1^{st}$ priority level vii) $7^{th}$ priority level: left block of the block having the $2^{nd}$ priority level, upper block of the block having the $3^{rd}$ priority level, right block of the block having the $4^{th}$ priority level, or lower block of the block having the $5^{th}$ priority level viii) $8^{th}$ priority level: block adjacent to the block having the $6^{th}$ priority level It will be understood that the scan order of the temporal neighboring blocks may vary according to an embodiment of the disclosure.

In an embodiment of the disclosure, the interpolation block generator 234 may determine availability of at least one temporal neighboring block according to a predetermined scan order until k (where k is a predetermined natural number) motion vector candidates are generated.

In an embodiment of the disclosure, when the number of motion vector candidates included in the motion vector candidate list is less than a predetermined number (e.g., k), the interpolation block generator 234 may add an alternative motion vector to the motion vector candidate list.

For example, the alternative motion vector may include a zero vector, a global vector set for the current interpolation picture 400 including the current interpolation block 430, and/or a first motion vector and a second motion vector of a neighboring interpolation block generated before the current interpolation block 430 within the current interpolation picture 400. In order to determine the neighboring interpolation block including the first motion vector and the second motion vector, BFS may be used.

In an embodiment of the disclosure, the global vector may be obtained from a bitstream transmitted from an image encoding apparatus to the image decoding apparatus 200, or may have a value pre-agreed or predetermined between the image encoding apparatus and the image decoding apparatus 200.

When all temporal neighboring blocks are unavailable, the interpolation block generator 234 may determine a first motion vector and a second motion vector of the current interpolation block 430 using an alternative motion vector.

Before describing a method of selecting a motion vector candidate for the current interpolation block 430 from a motion vector candidate list, an example of a method of deriving a motion vector candidate including a first motion vector and a second motion vector from a motion vector of a temporal neighboring block is described below with reference to FIG. 8.

Figure 8:
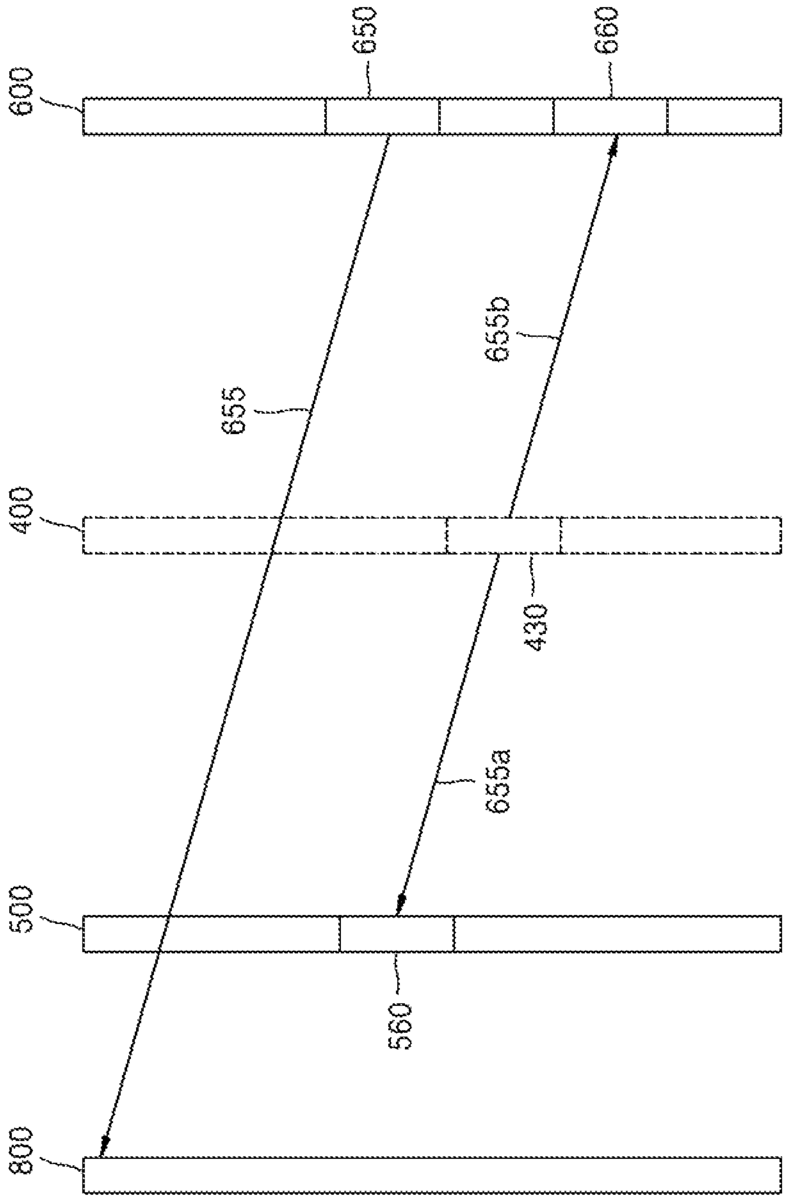
FIG. 8 is a diagram for describing a method of deriving a motion vector candidate including a first motion vector and a second motion vector from a motion vector of a temporal neighboring block, according to an embodiment of the disclosure.

FIG. 8 is a diagram for describing a method of deriving a motion vector candidate including a first motion vector and a second motion vector from a motion vector of a temporal neighboring block, according to an embodiment of the disclosure.

In the example shown in FIG. 8, a motion vector 655 of a temporal neighboring block 650 of the current interpolation block 430 indicates a block within a picture 800. The picture 800 may be a reference picture of the temporal neighboring block 650.

The interpolation block generator 234 may obtain a first motion vector 655*a* for the current interpolation block 430 from the motion vector 655 of the temporal neighboring block 650 based on a first difference between a POC of the picture 800 indicated by the motion vector 655 of the temporal neighboring block 650 and a POC of the picture 600 including the temporal neighboring block 650 and a second difference between a POC of the current picture 300 including the current block 350 and a POC of the first reference picture 500. For example, the interpolation block generator 234 may obtain the first motion vector 655*a* for the current interpolation block 430 by scaling the motion vector 655 of the temporal neighboring block 650 according to a ratio between the first difference and the second difference.

Also, the interpolation block generator 234 may obtain a second motion vector 655*b* for the current interpolation block 430 from the motion vector 655 of the temporal neighboring block 650 based on the first difference, and a third difference between the POC of the current picture 300 and the POC of the second reference picture 600. For example, the interpolation block generator 234 may obtain the second motion vector 655*b* for the current interpolation block 430 by scaling the motion vector 655 of the temporal neighboring block 650 according to a ratio between the first difference and the third difference.

In an embodiment of the disclosure, the interpolation block generator 234 may obtain the first motion vector 655*a* and the second motion vector 655*b* for the current interpolation block 430 from the motion vector 655 of the temporal neighboring block 650 according to Equation 1.

$$\text{mv\_cand0} = \text{mv\_temp} * (d2/d1) \qquad \text{Equation 1}$$

$$\text{mv\_cand1} = \text{mv\_temp} * (d3/d1)$$

In Equation 1, mv_cand0 may denote the first motion vector 655*a* of the current interpolation block 430, and mv_cand1 may denote the second motion vector 655*b* of the current interpolation block 430. Also, d1 may denote the first difference and may correspond to a value obtained by subtracting the POC of the picture 800 indicated by the motion vector 655 of the temporal neighboring block 650 from the POC of the picture 600 including the temporal neighboring block 650, and d2 may denote the second difference and may correspond to a value obtained by subtracting the POC of the first reference picture 500 from the POC of the current picture 300. Also, d3 may denote the third difference and may correspond to a value obtained by subtracting the POC of the second reference picture 600 from the POC of the current picture 300.

Referring to Equation 1, the motion vector 655 of the temporal neighboring block 650 may be scaled by a scaling factor, that is, d2/d1 and d3/d1.

The interpolation block generator 234 may establish a motion vector candidate list including at least one motion vector candidate using a motion vector of at least one temporal neighboring block.

Although the temporal neighboring block 650 is described above as including the motion vector 655 indicating one picture 800 with respect to FIG. 8, the temporal neighboring block 650 may further include a motion vector indicating a picture different from the picture 800. For example, when the temporal neighboring block 650 is bi-predicted, the temporal neighboring block 650 may include a motion vector (e.g., the motion vector 655) for list 0 and a motion vector for list 1.

In an embodiment of the disclosure, the interpolation block generator 234 may derive a motion vector candidate including a first motion vector and a second motion vector from a motion vector for list 0 of the temporal neighboring block 650, and may derive a motion vector candidate including a first motion vector and a second motion vector from a motion vector for list 1 of the temporal neighboring block 650. For example, when the temporal neighboring block 650 is bi-predicted, the interpolation block generator 234 may derive two motion vector candidates from motion vectors of the temporal neighboring block 650. Equation 1 may be used to derive two motion vector candidates.

In an embodiment of the disclosure, when two motion vector candidates are derived from motion vectors of the temporal neighboring block 650, both of the two motion vector candidates may be added to a motion vector candidate list.

In an embodiment of the disclosure, when two motion vector candidates are derived from motion vectors of the temporal neighboring block 650, only one of the two motion vector candidates may be added to a motion vector candidate list. In selecting one of the two motion vector candidates, a reliability described with reference to FIG. 9 may be considered.

In an embodiment of the disclosure, in selecting one of two motion vector candidates to be added to a motion vector candidate list, POCs of pictures indicated by two motion vectors of the temporal neighboring block 650 may be considered.

For example, the interpolation block generator 234 may add, to a motion vector candidate list, a motion vector candidate derived from a motion vector indicating a picture having a smaller POC difference from the current picture 300 from among two motion vectors.

As another example, the interpolation block generator 234 may add, to a motion vector candidate list, a motion vector candidate derived from a motion vector indicating a picture having a POC less (or greater) than a POC of the current picture 300 from among two motion vectors.

As another example, when a POC of the reference picture 600 including the temporal neighboring block 650 is greater than a POC of the current picture 300, the interpolation block generator 234 may add, to a motion vector candidate list, a motion vector candidate derived from a motion vector indicating a picture having a POC less than the POC of the current picture 300 from among two motion vectors.

As another example, when a POC of the reference picture 600 including the temporal neighboring block 650 is less than a POC of the current picture 300, the interpolation block generator 234 may add, to a motion vector candidate list, a motion vector candidate derived from a motion vector indicating a picture having a POC greater than the POC of the current picture 300 from among two motion vectors.

FIG. 9 is a diagram illustrating a motion vector candidate list, according to an embodiment of the disclosure.

Although FIG. 9 shows nine motion vector candidates as being included in a motion vector candidate list, this is an example, and the number of motion vector candidates that may be included in the motion vector candidate list may be changed.

Each motion vector candidate included in a motion vector candidate list according to a method of deriving the first motion vector 655*a* and the second motion vector 655*b* described with reference to FIG. 8 may include a first motion vector for indicating a block within the first reference picture 500 and a second motion vector for indicating a block within the second reference picture 600.

The interpolation block generator 234 may select a motion vector candidate for the current interpolation block 430 from among motion vector candidates included in the motion vector candidate list.

In an embodiment of the disclosure, the interpolation block generator 234 may select a motion vector candidate for the current interpolation block 430 by considering a reliability of each motion vector candidate.

In an embodiment of the disclosure, a reliability may be determined based on a similarity between the block within the first reference picture 500 and the block within the second reference picture 600 respectively indicated by the first motion vector and the second motion vector of each motion vector candidate.

As shown in FIG. 8, the first motion vector 655*a* derived from the motion vector 655 of the temporal neighboring block 650 may indicate a block 560 within the first reference picture 500, and the second motion vector 655*b* derived from the motion vector 655 of the temporal neighboring block 650 indicates a block 660 within the second reference picture 600. When a similarity between the block 560 within the first reference picture 500 and the block 660 within the second reference picture 600 is high, the interpolation block generator 234 may determine that a reliability of the first motion vector 665*a* and the second motion vector 665*b* is high.

In an embodiment of the disclosure, a difference value between the block within the first reference picture 500 indicated by the first motion vector and the block within the second reference picture 600 indicated by the second motion vector may be calculated according to Equation 2.

$$D(MV_{cand}) = \sum_{\vec{p} \in P} \rho\left(B_0(\vec{p} + MV_{cand0}), B_2(\vec{p} + MV_{cand1})\right) \quad \text{Equation 2}$$

In Equation 2, D(MVcand) may denote a difference value corresponding to a motion vector candidate MVcand, $B_0$ may denote a block within the first reference picture 500, and $B_2$ may denote a block within the second reference picture 600. Also, may denote a position of a sample within the current block 350, and P may denote samples within the current block 350. Also, MVcand0 may denote a first motion vector of the motion vector candidate MVcand, and MVcand1 may denote a second motion vector of the motion vector candidate MVcand. Also, ρ(x,y) is $|x-y|^p$. When p is 1, the p(x,y) may represent a sum of absolute differences (SAD), and when p is 2, the ρ(x) may represent a sum of squared differences (SSD).

Referring to FIG. 9, in an embodiment of the disclosure, the interpolation block generator 234 may calculate a D value according to Equation 2 for each motion vector candidate within the motion vector candidate list, and may select a motion vector candidate for the current interpolation block 430 based on the calculated D value.

For example, the interpolation block generator 234 may select a motion vector candidate having a smallest D value from among motion vector candidates within the motion vector candidate list as a motion vector candidate of the current interpolation block 430. Accordingly, a motion vector candidate having a highest reliability may be selected as a motion vector candidate of the current interpolation block 430.

Also, for example, the interpolation block generator 234 may calculate D values of motion vector candidates according to a predetermined order, and may select a motion vector candidate first identified to have a D value less than a predetermined value as a motion vector candidate of the current interpolation block 430. For example, while D values are sequentially calculated from a motion vector candidate 0 to a motion vector candidate 8 of FIG. 9, when a D value of the motion vector candidate 2 is identified to be less than a predetermined value, the interpolation block generator 234 may select the motion vector candidate 2 as a motion vector candidate of the current interpolation block 430 without calculating D values of the motion vector candidate 3 to the motion vector candidate 8. In an embodiment of the disclosure, the predetermined order may be determined in various ways.

Although FIG. 9 shows nine motion vector candidates corresponding to nine temporal neighboring blocks as being included in a motion vector candidate list, as described above, the number and arrangement of temporal neighboring blocks used to establish a motion vector candidate list may be changed in various ways.

In an embodiment of the disclosure, when the number of motion vector candidates derived from temporal neighboring blocks is less than a predetermined number, the interpolation block generator 234 may add an alternative motion vector to the motion vector candidate list as a motion vector candidate so that the number of motion vector candidates is equal to the predetermined number.

Referring to FIG. 10, when the number of motion vector candidates derived from temporal neighboring blocks is 4 and a predetermined number is 5, the interpolation block generator 234 may add a zero vector 910 as an alternative motion vector to a motion vector candidate list.

In an embodiment of the disclosure, the alternative motion vector may include a zero vector, a global vector set for the current interpolation picture 400, and/or a first motion vector and a second motion vector of a neighboring interpolation block adjacent to the current interpolation block 430.

In an embodiment of the disclosure, the interpolation block generator 234 may add i) the zero vector, ii) the global vector, or iii) the first motion vector and the second motion vector of the neighboring interpolation block as the alternative motion vector to the motion vector candidate list until the number of motion vector candidates is equal to a predetermined number.

In an embodiment of the disclosure, the interpolation block generator 234 may sequentially add i) the zero vector, ii) the global vector, and iii) the first motion vector and the second motion vector of the neighboring interpolation block to the motion vector candidate list according to a predetermined order until the number of motion vector candidates is equal to the predetermined number.

In an embodiment of the disclosure, the interpolation block generator 234 may obtain information (e.g., a flag or index) indicating a motion vector candidate from a bitstream, and may select a motion vector candidate for the current interpolation block 430 from among motion vector candidates included in the motion vector candidate list based on the obtained information.

When the motion vector candidate for the current interpolation block 430 is selected, as shown in FIG. 6, the interpolation block generator 234 may generate the current interpolation block 430 by combining the first block 530 within the first reference picture 500 indicated by the first motion vector 435*a* of the motion vector candidate with the second block 630 within the second reference picture 600 indicated by the second motion vector 435*b* of the motion vector candidate.

Hereinafter, examples of syntax for the current picture 300 and the current block 350 are described with reference to FIGS. 11 to 14.

FIG. 11 is a diagram illustrating syntax for the current picture 300, according to an embodiment of the disclosure.

FIG. 11 illustrates syntax of a picture parameter set, and pps_interpolation_pred_flag and pps_interpolation_pic_out_flag may be included in a picture parameter set of a bitstream.

In S1110, the bitstream obtainer 210 may obtain the pps_interpolation_pred_flag from the bitstream. The pps_interpolation_pred_flag may indicate whether an interpolation prediction mode is applicable to the current picture 300.

The interpolation prediction mode may be a mode in which the current picture 300 or the current block 350 is reconstructed according to the current interpolation picture 400 or the current interpolation block 430 generated based on the first reference picture 500 and the second reference picture 600.

In S1120, when the interpolation prediction mode is applicable to the current picture 300, the bitstream obtainer 210 may obtain the pps_interpolation_pic_out_flag in S1130. The pps_interpolation_pic_out_flag may indicate whether the current interpolation picture 400 corresponds to a reconstructed current picture.

In S1140, when the pps_interpolation_pic_out_flag is 1, the interpolation block generator 234 may generate the current interpolation picture 400 in S1150 using the first reference picture 500 and the second reference picture 600.

In an embodiment of the disclosure, the interpolation block generator 234 may split the current interpolation picture 400 into a plurality of interpolation blocks, and may obtain a first motion vector and a second motion vector for the interpolation blocks. The interpolation block generator 234 may generate the interpolation blocks by combining a block within the first reference picture 500 with a block within the second reference picture 600 indicated by the first motion vector and the second motion vector of each of the interpolation blocks.

A method of generating one interpolation block is described with reference to FIGS. 5 to 10, and thus, redundant or duplicative description thereof may be omitted.

The current interpolation picture 400 generated by the interpolation block generator 234 may be output for display as a reconstructed current picture.

When the pps_interpolation_pic_out_flag is 1, because the current picture 300 is reconstructed through the generation of the current interpolation picture 400, a process may be simplified compared to a case where the current picture 300 is split into blocks and decoded. For example, when the pps_interpolation_pic_out_flag is 1, a process of splitting the current picture 300 may not be performed.

When the pps_interpolation_pic_out_flag is 0, the current picture 300 may be decoded based on blocks. When the current picture 300 is decoded based on blocks, this may mean that the current picture 300 is split into blocks and the blocks are individually decoded according to prediction modes of the blocks.

FIG. 12 is a diagram illustrating syntax for the current block 350, according to an embodiment of the disclosure.

Syntax illustrated in FIG. 12 may be executed when the pps_interpolation_pic_out_flag is 0. This is because the current picture 300 is reconstructed based on a picture when the pps_interpolation_pic_out_flag is 1.

Although syntax of a coding unit is illustrated in FIG. 12 in which the current block 350 is a coding unit, in an embodiment of the disclosure, the current block 350 may be a largest coding unit or a transform unit.

In an embodiment of the disclosure, cu_skip_flag, pred_mode_flag, interpolation_pred_flag, and mv_idx illustrated in FIG. 12 may be included in slice data of a bitstream.

In S1210, the bitstream obtainer 210 may obtain the cu_skip_flag from the bitstream. The cu_skip_flag may indicate whether a skip mode is applied to a coding unit. The skip mode may refer to a mode in which the coding unit is reconstructed using a neighboring block, and only information indicating the neighboring block is signaled through the bitstream and motion information or residual data is not signaled.

In S1220, when the cu_skip_flag is 0, for example when the skip mode is not applied to the coding unit, the bitstream obtainer 210 may obtain the pred_mode_flag from the bitstream in S1230.

The pred_mode_flag may indicate whether an inter prediction mode is applied to the coding unit or an intra prediction mode is applied to the coding unit.

In S1240, when a prediction mode of the coding unit is not an intra prediction mode, for example when a prediction mode of the coding unit is an inter prediction mode, the bitstream obtainer 210 may obtain the interpolation_pred_flag from the bitstream in S1250. The interpolation_pred_flag may indicate whether an interpolation prediction mode is applied to the current block 350.

In S1260, when the interpolation_pred_flag indicates that an interpolation prediction mode is applied to the current block 350, the bitstream obtainer 210 may obtain the mv_idx from the bitstream in S1270.

When a motion vector predictor candidate list is established to obtain a motion vector of the current block 350, the mv_idx may indicate a motion vector predictor of the current block 350 from among motion vector predictor candidates included in the motion vector predictor candidate list.

In an embodiment of the disclosure, when a motion vector difference is applied to the motion vector predictor of the current block 350, a motion vector of the current block 350 may be obtained.

In an embodiment of the disclosure, the motion vector predictor of the current block 350 may be determined as a motion vector of the current block 350.

In an embodiment of the disclosure, the interpolation block generator 234 may determine a predetermined motion vector as a motion vector of the current block 350 without obtaining information indicating a motion vector of the current block 350 from the bitstream. In this case, the mv_idx may not be obtained from the bitstream.

When the motion vector of the current block 350 is obtained, the interpolation block generator 234 may identify the current interpolation block 430 within the current interpolation picture 400 using the motion vector of the current block 350, and may generate the current interpolation block 430 according to an embodiment described with reference to FIGS. 5 to 10.

As described above, the interpolation block generator 234 may identify an interpolation block located at the same position as the current block 350 within the current interpolation picture 400 as the current interpolation block 430. This may be understood as a zero vector applied to the current block 350.

FIG. 13 is a diagram illustrating syntax for the current picture 300, according to an embodiment of the disclosure.

FIG. 13 illustrates syntax of a picture parameter set, and pps_interpolation_pred_mode may be included in a picture parameter set of a bitstream.

In S1310, the bitstream obtainer 210 obtains the pps_interpolation_pred_mode from the bitstream. The pps_interpolation_pred_mode may indicate whether an interpolation prediction mode is applicable to the current picture 300 and whether the current interpolation picture 400 corresponds to a reconstructed current picture.

In S1320, when the pps_interpolation_pred_mode is not 0, for example, when the interpolation prediction mode is applicable to the current picture 300, it may be determined whether the pps_interpolation_pred_mode is 1 in S1330. When the pps_interpolation_pred_mode is 1, this may mean that the current interpolation picture 400 corresponds to a reconstructed current picture. When the pps_interpolation_pred_mode is 1, interpolation_pic( ) may be executed in S1340.

Through the interpolation_pic( ), the interpolation block generator 234 may generate the current interpolation picture 400, and may determine the current interpolation picture 400 as a reconstructed current picture.

The current interpolation picture 400 generated by the interpolation block generator 234 may be output for display as a reconstructed current picture.

In an embodiment of the disclosure, the reconstructor 236 may reconstruct the current picture by applying residual data to the current interpolation picture 400.

FIG. 14 is a diagram illustrating syntax for the current block 350, according to an embodiment of the disclosure.

Syntax illustrated in FIG. 14 may be executed when the pps_interpolation_pred_mode of FIG. 13 is not 1. This is because the current picture 300 is reconstructed based on a picture when the pps_interpolation_pred_mode is 1.

Although syntax of a coding unit is illustrated in FIG. 14 in which the current block 350 is a coding unit, in an embodiment of the disclosure, the current block 350 may be a largest coding unit or a transform unit.

In an embodiment, cu_skip_flag, pred_mode_flag, and mv_idx illustrated in FIG. 14 may be included in slice data of a bitstream.

In S1410, the bitstream obtainer 210 may obtain the cu_skip_flag from the bitstream. The cu_skip_flag may indicate whether a skip mode is applied to a coding unit.

In S1420, when the cu_skip_flag is 0, for example when the skip mode is not applied to the coding unit, the bitstream obtainer 210 may obtain the pred_mode_flag from the bitstream in S1430.

The pred_mode_flag may indicate whether the coding unit is reconstructed according to an inter prediction mode or reconstructed according to an intra prediction mode.

In S1440, when a prediction mode of the coding unit is not an intra prediction mode, for example when a prediction mode of the coding unit is an inter prediction mode, it may be determined whether pps_interpolation_pred_mode is 2 in S1450.

When the pps_interpolation_pred_mode is 2, this may mean that the coding unit is reconstructed using the current interpolation block 430.

When the pps_interpolation_pred_mode is 2, the bitstream obtainer 210 may obtain the mv_idx from the bitstream in S1460.

When a motion vector predictor candidate list is established to obtain a motion vector of the current block 350, the mv_idx may indicate a motion vector predictor of the current block 350 from among motion vector predictor candidates included in the motion vector predictor candidate list.

In an embodiment of the disclosure, when a motion vector difference is applied to the motion vector predictor of the current block 350, a motion vector of the current block 350 may be obtained.

In an embodiment of the disclosure, the motion vector predictor of the current block 350 may be determined as a motion vector of the current block 350.

In an embodiment of the disclosure, a motion vector obtainer 232 may determine a predetermined motion vector as a motion vector of the current block 350 without obtaining information indicating a motion vector of the current block 350 from the bitstream. In this case, the mv_idx may not be obtained from the bitstream.

When the motion vector of the current block 350 is obtained, the interpolation block generator 234 may identify the current interpolation block 430 within the current interpolation picture 400 using the motion vector of the current block 350, and may generate the current interpolation block 430 according to an embodiment described with reference to FIGS. 5 to 10.

In an embodiment of the disclosure, the interpolation block generator 234 may identify an interpolation block located at the same position as the current block 350 within the current interpolation picture 400 as the current interpolation block 430.

Figure 15:
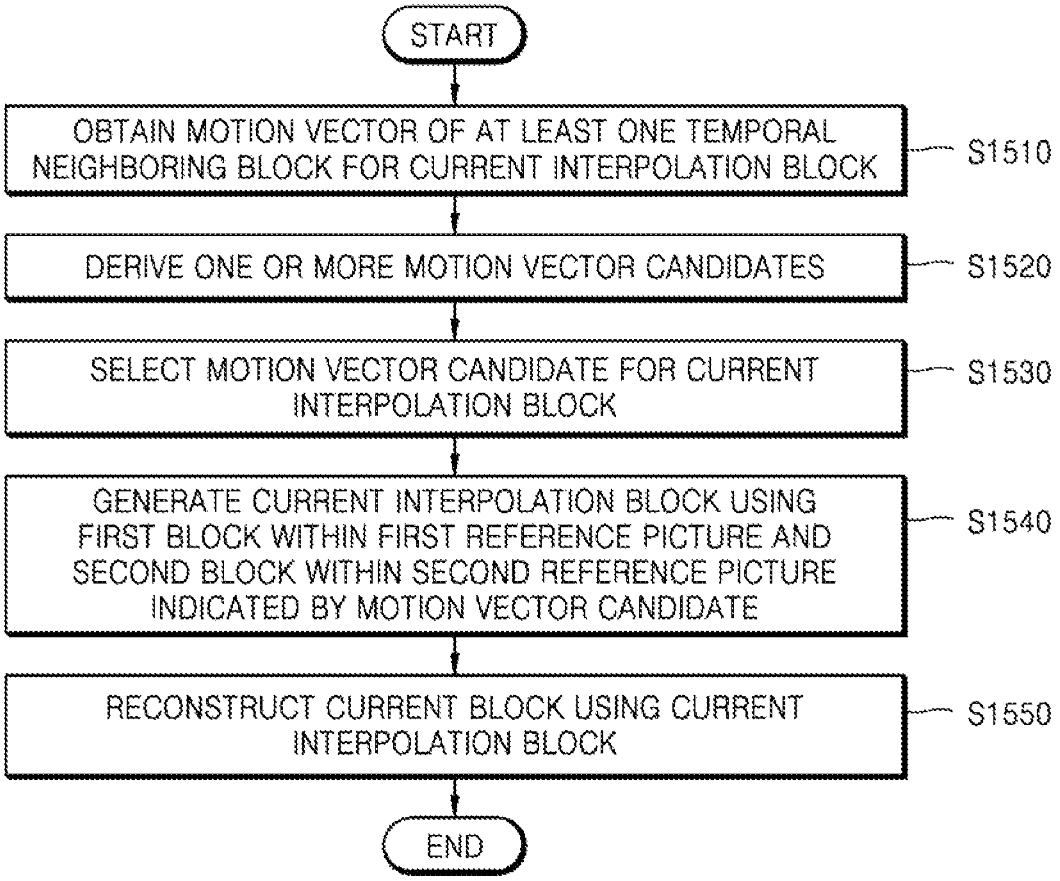
FIG. 15 is a flowchart illustrating an image decoding method, according to an embodiment of the disclosure.

FIG. 15 is a flowchart illustrating an image decoding method, according to an embodiment of the disclosure.

In operation S1510, the image decoding apparatus 200 obtains a motion vector of at least one temporal neighboring block for the current interpolation block 430.

In order to identify a position of the current interpolation block 430 to be generated, the image decoding apparatus 200 may apply a motion vector of the current block 350 to the current block 350.

In an embodiment of the disclosure, the image decoding apparatus 200 may obtain a motion vector of the current block 350 based on information obtained from a bitstream. In order to obtain a motion vector of the current block 350, the image decoding apparatus 200 may use a motion vector of a neighboring block reconstructed before the current block 350.

In an embodiment of the disclosure, the image decoding apparatus 200 may determine a predetermined motion vector as a motion vector of the current block 350 without obtaining information from the bitstream.

The image decoding apparatus 200 may split the current interpolation picture 400 into interpolation blocks of predetermined sizes, and may identify the current interpolation block 430 based on a motion vector of the current block 350 from among the interpolation blocks within the current interpolation picture 400.

In an embodiment of the disclosure, the image decoding apparatus 200 may determine an interpolation block located at the same position as the current block 350 from among interpolation blocks within the current interpolation picture 400 as the current interpolation block 430.

The temporal neighboring block may be a block from among blocks included in at least one of the first reference picture 500, the second reference picture 600, or the third reference picture. The position and the number of the temporal neighboring block(s) may be predetermined.

In operation S1520, the image decoding apparatus 200 derives one or more motion vector candidates using the motion vector of the at least one temporal neighboring block.

Each of the one or more motion vector candidates may include a first motion vector for indicating a block within the first reference picture 500 and a second motion vector for indicating a block within the second reference picture 600.

The image decoding apparatus 200 may derive a first motion vector and a second motion vector from the motion vector of the temporal neighboring block using a POC of the current picture 300, a POC of the first reference picture 500, a POC of the second reference picture 600, and a POC of a picture indicated by the motion vector of the temporal neighboring block.

In operation S1530, the image decoding apparatus 200 selects a motion vector candidate for the current interpolation block 430 from among the one or more motion vector candidates.

In selecting a motion vector candidate for the current interpolation block 430, a reliability of each of the one or more motion vector candidates may be considered.

In an embodiment of the disclosure, the image decoding apparatus 200 may select a motion vector candidate of the current interpolation block 430 from among the one or more motion vector candidates based on information obtained from the bitstream.

In operation S1540, the image decoding apparatus 200 generates the current interpolation block 430 using the first block 530 within the first reference picture 500 indicated by a first motion vector of the motion vector candidate selected for the current interpolation block 430 and the second block 630 within the second reference picture 600 indicated by a second motion vector of the motion vector candidate selected for the current interpolation block 430.

In operation S1550, the image decoding apparatus 200 reconstructs the current block 350 using the current interpolation block 430.

In an embodiment of the disclosure, when a reference block indicated by the motion vector of the current block 350 is a part of the current interpolation block 430, the image decoding apparatus 200 may reconstruct the current block 350 using sample values of a partial area of the current interpolation block 430.

In an embodiment of the disclosure, the image decoding apparatus 200 may obtain a sample value of the current block 350 by combining a residual sample value for the current block 350 with a sample value of the current interpolation block 430.

Figure 16:
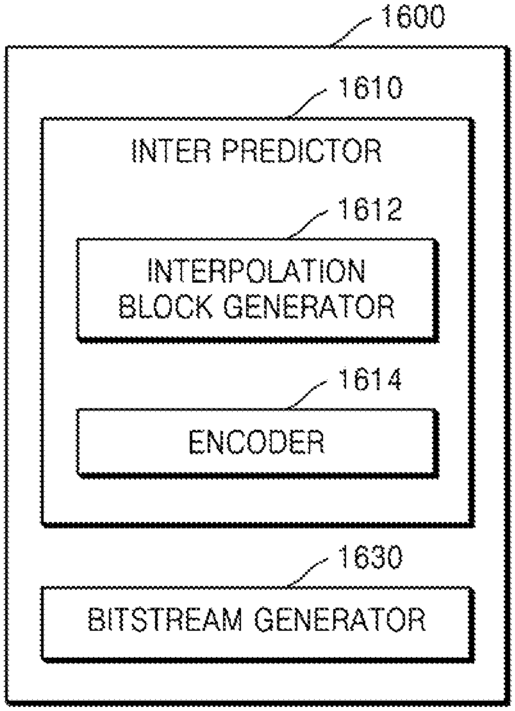
FIG. 16 is a block diagram illustrating an image encoding apparatus, according to an embodiment of the disclosure.

FIG. 16 is a diagram illustrating a configuration of an image encoding apparatus, according to an embodiment of the disclosure.

Referring to FIG. 16, an image encoding apparatus 1600 may include an inter predictor 1610 and a bitstream generator 1630.

The inter predictor 1610 and the bitstream generator 1630 according to an embodiment of the disclosure may be implemented as, by, or using at least one processor. In an embodiment of the disclosure, the inter predictor 1610 and the bitstream generator 1630 may operate according to instructions stored in a memory.

The image encoding apparatus 1600 may include the memory in which input/output data of the inter predictor 1610 and the bitstream generator 1630 are stored. Also, the image encoding apparatus 1600 may include a memory controller for controlling data input and/or data output of the memory.

When an interpolation prediction mode using the current interpolation picture 400 or the current interpolation block 430 is applied to the current block 350, the inter predictor 1610 may generate the current interpolation block 430 based on the first reference picture 500 and the second reference picture 600 for the current block 350 or the current picture 300, and may encode the current block 350 using the current interpolation block 430.

In an embodiment of the disclosure, when the current interpolation picture 400 corresponds to the current picture 300, the inter predictor 1610 may generate the current interpolation picture 400 including interpolation blocks using the first reference picture 500 and the second reference picture 600, and may encode the current picture 300 using the current interpolation picture 400.

In an embodiment of the disclosure, encoding of the current block 350 or encoding of the current picture 300 may refer to a process of generating information used to reconstruct the current block 350 or the current picture 300.

In an embodiment of the disclosure, the information used to reconstruct the current block 350 or the current picture 300 may include some or all of the following information:

i) information indicating whether an interpolation prediction mode is applicable to the current picture 300 ii) when the interpolation prediction mode is applicable to the current picture 300, information indicating whether the current interpolation picture 400 corresponds to the current picture (or a reconstructed current picture)

iii) information indicating whether the interpolation prediction mode is applied to the current block 350 iv) when the interpolation prediction mode is applied to the current block 350, information indicating a motion vector for indicating the current interpolation block 430 within the current interpolation picture 400 v) information indicating the first reference picture 500 and the second reference picture 600 for the current picture 300 or the current block 350 vi) information indicating a motion vector candidate for the current interpolation block 430 from among motion vector candidates included in a motion vector candidate list vii) residual information corresponding to a difference between the current block 350 and the current interpolation block 430 (or the reference block 450 within the current interpolation block 430)

viii) residual information corresponding to a difference between the current picture 300 and the current interpolation picture 400

The above information is an example, and the information generated through encoding of the current picture 300 may include some of the above information or may further include information in addition to the above information.

Referring to FIG. 16, the inter predictor 1610 may include an interpolation block generator 1612 and an encoder 1614.

The interpolation block generator 1612 may generate the current interpolation block 430 for encoding the current block 350.

In an embodiment of the disclosure, the interpolation block generator 1612 may identify the current interpolation block 430 located at the same position as the current block 350 from among interpolation blocks within the current interpolation picture 400, and may generate the current interpolation block 430 using the first reference picture 500 and the second reference picture 600.

In an embodiment of the disclosure, the interpolation block generator 1612 may generate interpolation blocks of the current interpolation picture 400, and may determine the current interpolation block 430 corresponding to the current block 350 from among the generated interpolation blocks.

For example, the interpolation block generator 1612 may generate interpolation blocks within the current interpolation picture 400, and may determine an interpolation block that is most similar to the current block 350 within the current interpolation picture 400 or an interpolation block including a block that is most similar to the current block 350 as the current interpolation block 430.

Also, for example, the interpolation block generator 1612 may generate an interpolation block located at the same position as the current block 350 from among interpolation blocks within the current interpolation picture 400 and neighboring interpolation blocks of the interpolation block located at the same position, and may determine an interpolation block that is most similar to the current block 350 from among the generated interpolation blocks or an interpolation block including the block that is most similar to the current block 350 as the current interpolation block 430.

In an embodiment of the disclosure, when the current interpolation block 430 is determined from multiple interpolation blocks, the interpolation block generator 1612 may determine a motion vector indicating the current interpolation block 430.

In an embodiment of the disclosure, when a position of the current interpolation block 430 corresponding to the current block 350 is pre-agreed or predetermined between the image decoding apparatus 200 and the image encoding apparatus 1600, the interpolation block generator 1612 may not determine a motion vector indicating the current interpolation block 430.

The interpolation block generator 1612 may select the first reference picture 500 and the second reference picture 600 from among pictures encoded before the current picture 300 to generate the current interpolation block 430.

As described above with reference to FIG. 5, the interpolation block generator 1612 may select the first reference picture 500 and the second reference picture 600 from among the pictures 51, 52, 53, 54, 55, 56, and 58 encoded before the current picture 300.

A method of selecting the first reference picture 500 and the second reference picture 600 from among pictures encoded/decoded before the current picture 300 is described above with reference to FIG. 5, and thus, redundant or duplicative description thereof may be omitted.

In an embodiment of the disclosure, the interpolation block generator 1612 may determine at least one temporal neighboring block from at least one of the first reference picture 500, the second reference picture 600, or the third reference picture, and may generate one or more motion vector candidates using a motion vector of the at least temporal neighboring block.

In an embodiment of the disclosure, the at least one temporal neighboring block may include a block located at a predetermined position from among blocks included in the first reference picture 500, the second reference picture 600, and/or the third reference picture.

In an embodiment of the disclosure, the at least one temporal neighboring block may include a block located at the same position as the current interpolation block 430 from among blocks included in the first reference picture 500, the second reference picture 600, and/or the third reference picture.

In an embodiment of the disclosure, the at least one temporal neighboring block may include at least one block adjacent to a block located at the same position as the current interpolation block 430 from among blocks included in a reference picture.

The at least one temporal neighboring block is described above with reference to FIG. 7, and thus, redundant or duplicative description thereof may be omitted.

The interpolation block generator 1612 may establish a motion vector candidate list for the current interpolation block 430 using the motion vector of the at least one temporal neighboring block.

In an embodiment of the disclosure, each motion vector candidate included in the motion vector candidate list may include a first motion vector for indicating a block within the first reference picture 500 and a second motion vector for indicating a block within the second reference picture 600.

In an embodiment of the disclosure, the motion vector candidate list may further include a first motion vector and a second motion vector of a neighboring interpolation block of the current interpolation block 430 as motion vector candidates. In this case, in order to determine the neighboring interpolation block including the first motion vector and the second motion vector, BFS may be used.

In an embodiment of the disclosure, when the motion vector candidate list is established, the interpolation block generator 1612 may determine availability of the at least one temporal neighboring block and may generate a motion vector candidate using a motion vector of a temporal neighboring block determined to be available. For example, when an intra prediction mode is applied to one temporal neighboring block, the interpolation block generator 1612 may determine that the temporal neighboring block is unavailable. Also, for example, when a motion vector of one temporal neighboring block is the same as a motion vector of another temporal neighboring block, the interpolation block generator 1612 may determine that the one temporal neighboring block is unavailable.

In an embodiment of the disclosure, the interpolation block generator 1612 may determine availability of each of the at least one temporal neighboring block according to a predetermined scan order, and may sequentially generate motion vector candidates from motion vectors of temporal neighboring blocks determined to be available.

In an embodiment of the disclosure, the interpolation block generator 1612 may determine availability of the at least one temporal neighboring block according to a predetermined scan order until k (where k is a predetermined natural number) motion vector candidates are generated.

In an embodiment of the disclosure, when the number of motion vector candidates included in the motion vector candidate list is less than a predetermined number (e.g., k), the interpolation block generator 1612 may add an alternative motion vector to the motion vector candidate list.

For example, the alternative motion vector may include a zero vector, a global vector set for the current interpolation picture 400 including the current interpolation block 430, and/or a first motion vector and a second motion vector of a neighboring interpolation block of the current interpolation block 430. In order to determine the neighboring interpolation block, BFS may be used.

In an embodiment of the disclosure, when all temporal neighboring blocks are unavailable, the interpolation block generator 1612 may determine a first motion vector and a second motion vector of the current interpolation block 430 using an alternative motion vector.

The interpolation block generator 1612 may select a motion vector candidate for the current interpolation block 430 from among motion vector candidates included in the motion vector candidate list.

In an embodiment of the disclosure, the interpolation block generator 1612 may select a motion vector candidate for the current interpolation block 430 by considering a reliability of each of the motion vector candidates. A reliability of each of the motion vector candidates may be derived based on Equation 2.

When the motion vector candidate for the current interpolation block 430 is selected, as shown in FIG. 6, the interpolation block generator 1612 may generate the current interpolation block 430 by combining the first block 530 within the first reference picture 500 indicated by the first motion vector 435*a* of the motion vector candidate with the second block 630 within the second reference picture 600 indicated by a second motion vector 435*b* of the motion vector candidate.

The encoder 1614 may encode the current block 350 using the current interpolation block 430.

In an embodiment of the disclosure, the encoder 1614 may generate residual data corresponding to a difference between sample values of the current interpolation block 430 (or the reference block 450 of the current block 350) and sample values of the current block 350.

In an embodiment of the disclosure, the current interpolation block 430 may be determined to be the current block 350. In this case, the encoder 1614 may generate information indicating that the current interpolation block 430 is used to reconstruct the current block 350.

In an embodiment of the disclosure, when the current interpolation picture 400 corresponds to the current picture 300, the encoder 1614 may generate residual data corresponding to a difference between sample values of the current interpolation picture 400 and sample values of the current picture 300.

In an embodiment of the disclosure, the current interpolation picture 400 may be determined to be the current picture 300 (or a reconstructed current picture). In this case, the encoder 1614 may generate information indicating that the current interpolation picture 400 is used to reconstruct the current picture 300.

The bitstream generator 1630 may generate a bitstream including a result of encoding the current picture 300 or the current block 350.

The bitstream generator 1630 may include values of syntax elements generated through encoding of the current picture 300 or the current block 350 in the bitstream according to a hierarchical structure of a picture.

The bitstream generator 1630 may generate the bitstream by binarizing and/or entropy coding the values of the syntax elements generated through encoding of the current picture 300 or the current block 350.

In an embodiment of the disclosure, the bitstream generated by the bitstream generator 1630 may be transmitted to the image decoding apparatus 200 through a network.

In an embodiment of the disclosure, the bitstream may be recorded on a data storage medium including a magnetic medium such as a hard disk, a floppy disk, or a magnetic tape, an optical recording medium such as a CD-ROM or a DVD, or a magneto-optical medium such as a floptical disk.

Figure 17:
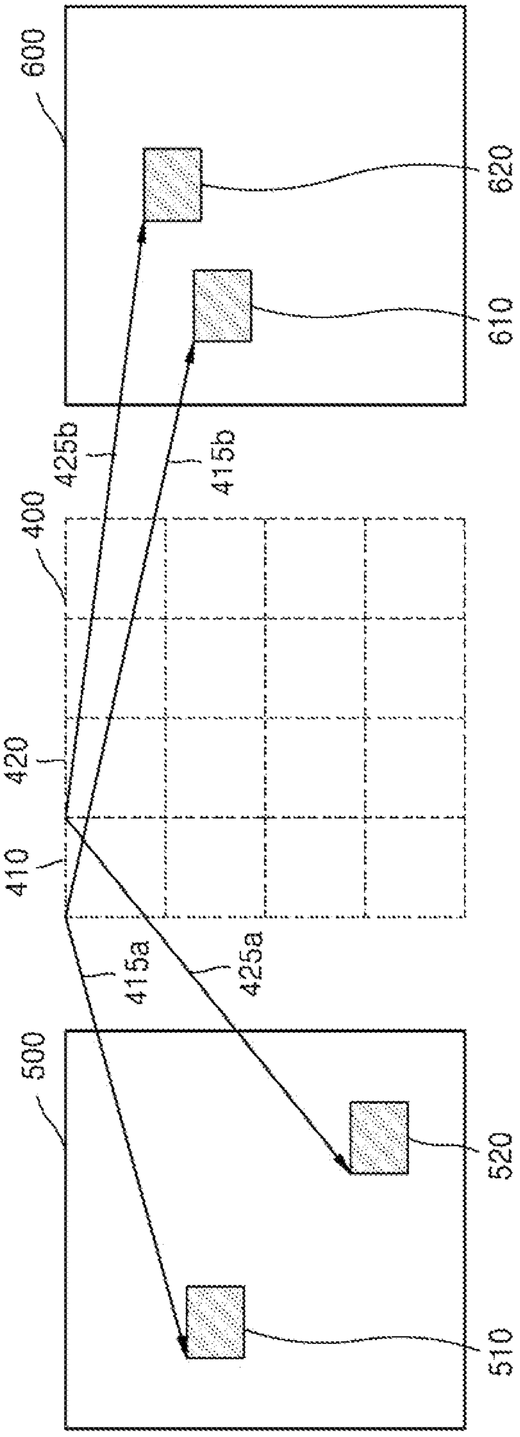
FIG. 17 is a diagram for describing a method of generating a current interpolation picture, according to an embodiment of the disclosure.

FIG. 17 is a diagram for describing a method of generating the current interpolation picture 400, according to an embodiment of the disclosure.

In an embodiment of the disclosure, when a position of the current interpolation block 430 is pre-agreed or predetermined between the image encoding apparatus 1600 and the image decoding apparatus 200, the interpolation block generator 1612 may generate the current interpolation block 430 of a predetermined position based on the first reference picture 500 and the second reference picture 600.

The interpolation block generator 1612 may determine a temporal neighboring block of the current interpolation block 430 from the first reference picture 500, the second reference picture 600, and/or the third reference picture, and may determine a motion vector candidate of the current interpolation block 430 using a motion vector of the temporal neighboring block. The interpolation block generator 1612 may generate the current interpolation block 430 by combining a block within the first reference picture 500 indicated by a first motion vector of the motion vector candidate with a block within the second reference picture 600 indicated by a second motion vector of the motion vector candidate.

In an embodiment of the disclosure, a position of the current interpolation block 430 may not be pre-agreed or predetermined between the image encoding apparatus 1600 and the image decoding apparatus 200. In this case, the interpolation block generator 1612 may generate a plurality of interpolation blocks and may identify the current interpolation block 430 corresponding to the current block 350 from among the plurality of interpolation blocks.

For example, the interpolation block generator 1612 may split the current interpolation picture 400 into interpolation blocks of predetermined sizes, and may generate each of the interpolation blocks within the current interpolation picture 400 based on the first reference picture 500 and the second reference picture 600.

Also, for example, the interpolation block generator 1612 may split the current interpolation picture 400 into interpolation blocks of predetermined sizes, and may generate interpolation blocks within a predetermined range (e.g., within a certain distance from the same position as the current block 350) from among the interpolation blocks of the current interpolation picture 400 based on the first reference picture 500 and the second reference picture 600.

When the current interpolation block 430 is identified from among the interpolation blocks, the interpolation block generator 1612 may determine a motion vector of the current block 350 for indicating the identified current interpolation block 430.

In an embodiment of the disclosure, the motion vector of the current block 350 may indicate a reference block within the current interpolation block 430.

Referring to FIG. 17, the interpolation block generator 1612 may split the current interpolation picture 400 into interpolation blocks of predetermined sizes.

The interpolation block generator 1612 may generate interpolation blocks using a first motion vector and a second motion vector of each of the interpolation blocks.

As shown in FIG. 17, when a first motion vector 415*a* and a second motion vector 415*b* are determined for a first interpolation block 410, the first interpolation block 410 may be generated based on a block 510 within the first reference picture 500 indicated by the first motion vector 415*a*, and a block 610 within the second reference picture 600 indicated by the second motion vector 415*b*. The first motion vector 415*a* and the second motion vector 415*b* of the first interpolation block 410 may be derived from a temporal neighboring block of the first interpolation block 410.

When a first motion vector 425*a* and a second motion vector 425*b* are determined for a second interpolation block 420, the second interpolation block 420 may be generated based on a block 520 within the first reference picture 500 indicated by the first motion vector 425*a* and a block 620 within the second reference picture 600 indicated by the second motion vector 425*b*. The first motion vector 425*a* and the second motion vector 425*b* of the second interpolation block 420 may be derived from a temporal neighboring block of the second interpolation block 420.

When the current interpolation picture 400 including the first interpolation block 410 and the second interpolation block 420 is generated, the interpolation block generator 1612 may determine an interpolation block that is similar to the current block 350 within the current interpolation picture 400 or an interpolation block including a reference block similar to the current block 350 as the current interpolation block 430.

In an embodiment of the disclosure, when the current interpolation block 430 is determined, the encoder 1614 may encode the current block 350 based on the current interpolation block 430.

In an embodiment of the disclosure, when the current interpolation picture 400 is generated, the encoder 1614 may encode the current picture 300 based on the current interpolation picture 400.

Figure 18:
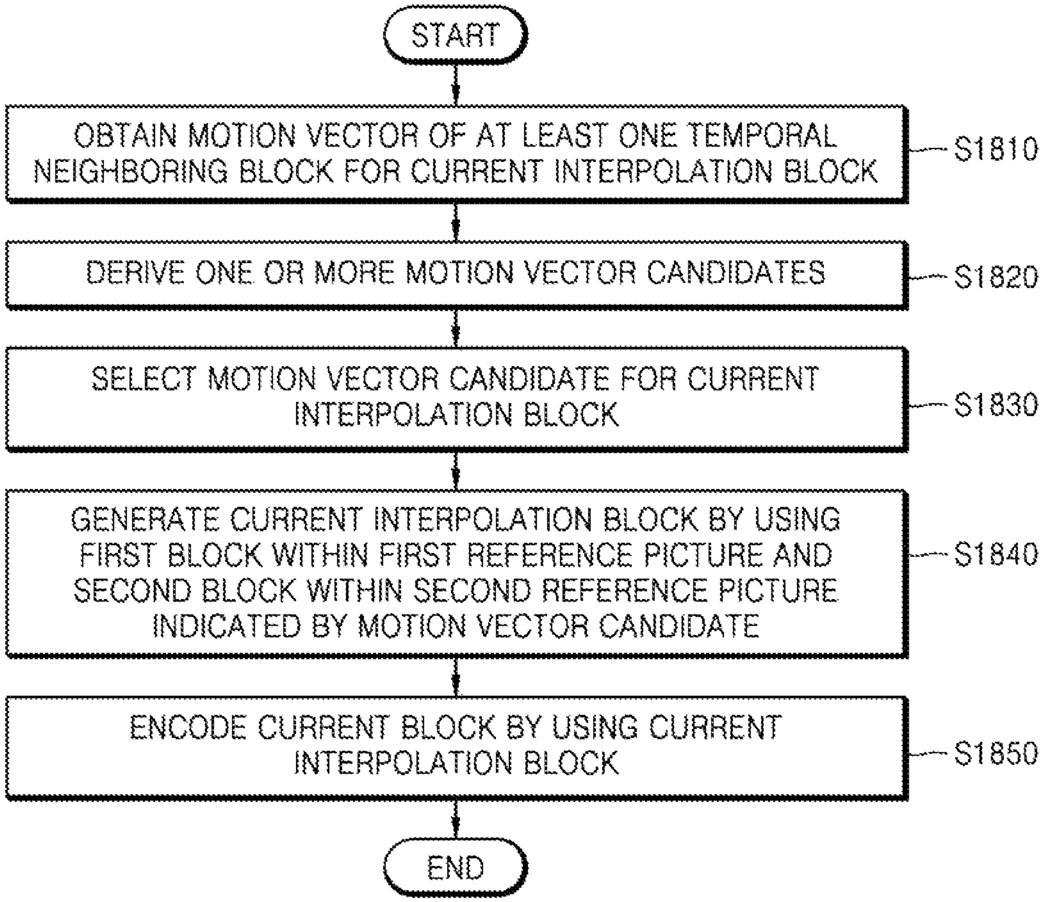
FIG. 18 is a flowchart illustrating an image encoding method, according to an embodiment of the disclosure.

FIG. 18 is a flowchart illustrating an image encoding method, according to an embodiment of the disclosure.

In operation S1810, the image encoding apparatus 1600 obtains a motion vector of at least one temporal neighboring block for the current interpolation block 430.

In an embodiment of the disclosure, the image encoding apparatus 1600 may split the current interpolation picture 400 into interpolation blocks of predetermined sizes, and may identify the current interpolation block 430 of a predetermined position within the current interpolation picture 400.

In an embodiment of the disclosure, the image encoding apparatus 1600 may determine an interpolation block located at the same position as the current block 350 from among interpolation blocks within the current interpolation picture 400 as the current interpolation block 430.

The temporal neighboring block may be a block from among blocks included in at least one of the first reference picture 500, the second reference picture 600, or the third reference picture. The position and the number of the temporal neighboring block(s) may be predetermined.

In operation S1820, the image encoding apparatus 1600 derives one or more motion vector candidates using the motion vector of the at least one temporal neighboring block.

Each of the one or more motion vector candidates may include a first motion vector for indicating a block within the first reference picture 500 and a second motion vector for indicating a block within the second reference picture 600.

The image encoding apparatus 1600 may derive a first motion vector and a second motion vector from the motion vector of the temporal neighboring block, using a POC of the current picture 300, a POC of the first reference picture 500, a POC of the second reference picture 600, and a POC of a picture indicated by the motion vector of the temporal neighboring block.

In operation S1830, the image encoding apparatus 1600 selects a motion vector candidate for the current interpolation block 430 from among the one or more motion vector candidates.

In selecting a motion vector candidate for the current interpolation block 430, a reliability of each of the one or more motion vector candidates may be considered.

In operation S1840, the image encoding apparatus 1600 generates the current interpolation block 430 using a first block within the first reference picture 500 indicated by a first motion vector of the motion vector candidate selected for the current interpolation block 430 and a second block within the second reference picture 600 indicated by a second motion vector of the motion vector candidate selected for the current interpolation block 430.

In operation S1850, the image encoding apparatus 1600 encodes the current block 350 using the current interpolation block 430.

In an embodiment of the disclosure, the image encoding apparatus 1600 may generate residual data corresponding to a difference between sample values of the current interpolation block 430 and sample values of the current block 350 as an encoding result.

The embodiment of FIG. 18 may correspond to a case where a position of the current interpolation block 430 is identified before the current interpolation block 430 is generated.

In an embodiment of the disclosure, the current interpolation block 430 may not be identified before interpolation blocks within the current interpolation picture 400 are generated. In an embodiment of the disclosure, the image encoding apparatus 1600 may split the current interpolation picture 400 into predetermined interpolation blocks, and may generate interpolation blocks using the first reference picture 500 and the second reference picture 600. The image encoding apparatus 1600 may identify the current interpolation block 430 corresponding to the current block 350 from among the generated interpolation blocks.

When the current interpolation block 430 is identified, the image encoding apparatus 1600 may determine a motion vector of the current block 350 for indicating the current interpolation block 430. The image encoding apparatus 1600 may generate information (e.g., a flag or index) indicating the motion vector of the current block 350.

Figure 19:
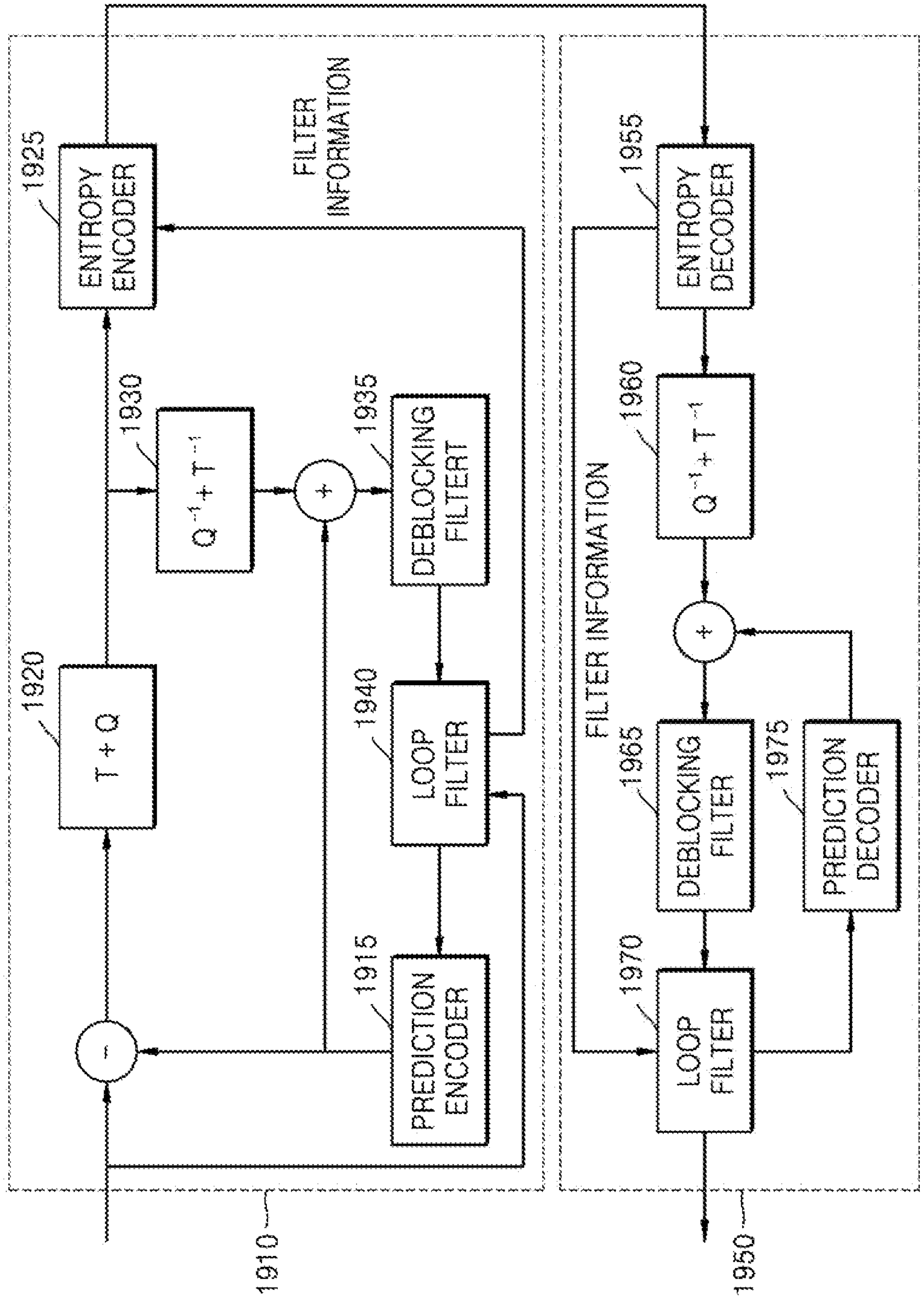
FIG. 19 is a block diagram illustrating configurations of an image encoding apparatus and an image decoding apparatus, according to an embodiment of the disclosure.

FIG. 19 is a block diagram illustrating configurations of an image encoding apparatus 1910 and an image decoding apparatus 1950, according to an embodiment of the disclosure.

The bitstream obtainer 210 described with reference to FIG. 2 may correspond to an entropy decoder 1955 of FIG. 19, and the inter predictor 230 may correspond to a prediction decoder 1975 of FIG. 19.

Also, the inter predictor 1610 described with reference to FIG. 16 may correspond to a prediction encoder 1915 of FIG. 19, and the bitstream generator 1630 may correspond to an entropy encoder 1925.

The image encoding apparatus 1910 may transmit a bitstream generated as a result of encoding a picture, and the image decoding apparatus 1950 may receive and decode the bitstream and output a reconstructed picture.

In the image encoding apparatus 1910, the prediction encoder 1915 may generate a prediction block through inter prediction and intra prediction, and a transformer and quantizer 1920 may quantize residual data between the prediction block and the current block 350 into a quantized transform coefficient and output the quantized transform coefficient.

The entropy encoder 1925 may encode the quantized transform coefficient and output the encoded quantized transform coefficient as a bitstream.

The quantized transform coefficient may be reconstructed into data of a spatial domain via an inverse quantizer and inverse transformer 1930, and the data of the reconstructed spatial domain may be output as a reconstructed picture via a deblocking filter 1935 and a loop filter 1940. The reconstructed picture may be used as a reference picture of a next picture in the prediction encoder 1915.

Encoded picture data among the bitstream received by the image decoding apparatus 1950 may be reconstructed as residual data of a spatial domain via the entropy decoder 1955 and an inverse quantizer and inverse transformer 1960.

Picture data of a spatial domain is configured when a prediction block output from the prediction decoder 1975 and the residual data are combined, and a deblocking filter 1965 and a loop filter 1970 may output a reconstructed picture for the current picture 300 by performing filtering on the picture data of the spatial domain. The reconstructed picture may be used by the prediction decoder 1975 as a reference picture for a next picture.

The loop filter 1940 of the image encoding apparatus 1910 may perform loop filtering using filter information input according to a user input or system setting. The filter information used by the loop filter 1940 may be output to the entropy encoder 1925 and transmitted to the image decoding apparatus 1950 along with the encoded picture data.

The loop filter 1970 of the image decoding apparatus 1950 may perform loop filtering based on the input filter information.

An objective of an image encoding method and apparatus and an image decoding method and apparatus according to an embodiment of the disclosure is to reduce the number of motion information requiring signaling to reconstruct the current block 350.

An objective of an image encoding method and apparatus and an image decoding method and apparatus according to an embodiment of the disclosure is to generate an interpolation block suitable to reconstruct the current block 350.

An objective of an image encoding method and apparatus and an image decoding method and apparatus according to an embodiment of the disclosure is to reduce a bit rate of a bitstream.

An image decoding method according to an embodiment of the disclosure may include obtaining a motion vector of at least one temporal neighboring block included in at least one of the first reference picture 500 or the second reference picture 600.

The image decoding method according to an embodiment of the disclosure may include deriving one or more motion vector candidates from the motion vector of the at least one temporal neighboring block.

In an embodiment of the disclosure, each of the one or more motion vector candidates may include a first motion vector for indicating a block within the first reference picture 500 and a second motion vector for indicating a block within the second reference picture 600.

The image decoding method according to an embodiment of the disclosure may include selecting a motion vector candidate for the current interpolation block from among the one or more motion vector candidates.

The image decoding method according to an embodiment of the disclosure may generate the current interpolation block 430 using a first block within the first reference picture 500 indicated by a first motion vector of the selected motion vector candidate and a second block within the second reference picture 600 indicated by a second motion vector of the selected motion vector candidate.

The image decoding method according to an embodiment of the disclosure may include reconstructing the current block 350 using the current interpolation block 430.

In an embodiment of the disclosure, the at least one temporal neighboring block may include a block located at the same position as the current interpolation block 430 from among blocks included in at least one of the first reference picture 500 or the second reference picture 600 or a block adjacent to the block located at the same position.

In an embodiment of the disclosure, the selecting of the motion vector candidate for the current interpolation block 430 may include selecting a motion vector candidate for the current interpolation block 430 from among the one or more motion vector candidates based on a difference value between a block indicated within the first reference picture 500 by a first motion vector of the one or more motion vector candidates and a block indicated within the second reference picture 600 by a second motion vector of the one or more motion vector candidates.

In an embodiment of the disclosure, a motion vector candidate having a smallest difference value from among the one or more motion vector candidates may be selected as a motion vector candidate for the current interpolation block 430.

In an embodiment of the disclosure, whether a difference value of each of the one or more motion vector candidates is less than a preset value according to a preset order may be determined, and a motion vector candidate that is first identified to have a difference value less than the preset value may be selected as a motion vector candidate for the current interpolation block 430.

In an embodiment of the disclosure, the one or more motion vector candidates may include a motion vector candidate including a first motion vector and a second motion vector of a neighboring interpolation block adjacent to the current interpolation block 430.

In an embodiment of the disclosure, the deriving of the one or more motion vector candidates may include: determining availability of the at least one temporal neighboring block; and when the at least one temporal neighboring block is unavailable, determining a first motion vector and a second motion vector for the current interpolation block 430 using an alternative motion vector.

In an embodiment of the disclosure, the alternative motion vector may include a zero vector, a global vector set for the current interpolation picture 400 including the current interpolation block 430, or a first motion vector and a second motion vector of a neighboring interpolation block adjacent to the current interpolation block 430.

In an embodiment of the disclosure, the deriving of the one or more motion vector candidates may include deriving a first motion vector of the one or more motion vector candidates from the motion vector of the at least one temporal neighboring block based on a first POC difference between a picture indicated by the motion vector of the at least one temporal neighboring block and a reference picture including the at least one temporal neighboring block and a second POC difference between the current picture 300 and the first reference picture 500, and deriving a second motion vector of the one or more motion vector candidates from the motion vector of the at least one temporal neighboring block based on the first POC difference, and a third POC difference between the current picture 300 and the second reference picture 600.

In an embodiment of the disclosure, a picture having a POC that is less than a POC of the current picture 300 and has a smallest difference from the POC of the current picture 300 from among pictures reconstructed before the current picture 300 may be selected as the first reference picture 500, and a picture having a POC that is greater than the POC of the current picture 300 and has a smallest difference from the POC of the current picture 300 from among the pictures reconstructed before the current picture 300 may be selected as the second reference picture 600.

In an embodiment of the disclosure, the image decoding method may further include: obtaining, from a bitstream, first information indicating whether the current interpolation picture 400 corresponds to the reconstructed current picture; when the first information indicates that the current interpolation picture 400 corresponds to a reconstructed current picture, generating the current interpolation picture 400 including the current interpolation block 430 using the first reference picture 500 and the second reference picture; and determining the reconstructed current picture based on the current interpolation picture 400.

In an embodiment of the disclosure, the image decoding method may further include, when the first information indicates that the current interpolation picture 400 does not correspond to the reconstructed current picture, obtaining, from a bitstream, second information indicating whether the current interpolation block 430 is used to reconstruct the current block 350, wherein when the second information indicates that the current interpolation block 430 is used, the current block 350 is reconstructed using the current interpolation block 430.

In an embodiment of the disclosure, the first information may be obtained from a bitstream for the current picture 300, and the second information may be obtained from a bitstream for the current block 350.

The interpolation block generator 234 of the image decoding apparatus 200 according to an embodiment of the disclosure may obtain a motion vector of at least one temporal neighboring block included in at least one of the first reference picture 500 or the second reference picture 600.

The interpolation block generator 234 of the image decoding apparatus 200 according to an embodiment of the disclosure may derive one or more motion vector candidates from the motion vector of the at least one temporal neighboring block.

In an embodiment of the disclosure, each of the one or more motion vector candidates may include a first motion vector for indicating a block within the first reference picture 500 and a second motion vector for indicating a block within the second reference picture 600.

The interpolation block generator 234 of the image decoding apparatus 200 according to an embodiment of the disclosure may select a motion vector candidate for the current interpolation block 430 from among the one or more motion vector candidates.

The interpolation block generator 234 of the image decoding apparatus 200 according to an embodiment of the disclosure may generate the current interpolation block 430 using a first block within the first reference picture 500 indicated by a first motion vector of the selected motion vector candidate and a second block within the second reference picture 600 indicated by a second motion vector of the selected motion vector candidate.

The reconstructor 236 of the image decoding apparatus 200 according to an embodiment of the disclosure may reconstruct the current block 350 using the current interpolation block 430.

An image encoding method according to an embodiment of the disclosure may include obtaining a motion vector of at least one temporal neighboring block for the current interpolation block 430 from at least one of the first reference picture 500 or the second reference picture 600.

The image encoding method according to an embodiment of the disclosure may include deriving one or more motion vector candidates from the motion vector of the at least one temporal neighboring block.

In an embodiment of the disclosure, each of the one or more motion vector candidates may include a first motion vector for indicating a block within the first reference picture 500 and a second motion vector for indicating a block within the second reference picture 600.

The image encoding method according to an embodiment of the disclosure may include selecting a motion vector candidate for the current interpolation block 430 from among the one or more motion vector candidates.

The image encoding method according to an embodiment of the disclosure may include generating the current interpolation block 430 using a first block within the first reference picture 500 indicated by a first motion vector of the selected motion vector candidate and a second block within the second reference picture 600 indicated by a second motion vector of the selected motion vector candidate.

The image encoding method according to an embodiment of the disclosure may include encoding the current block 350 using the current interpolation block 430.

In an embodiment of the disclosure, the obtaining of the motion vector of the at least one temporal neighboring block may include determining a block located at the same position as the current interpolation block 430 from among blocks included in at least one of the first reference picture 500 or the second reference picture 600 and a block adjacent to the block located at the same position as at least one temporal neighboring block.

In an embodiment of the disclosure, the image encoding method may further include: generating first information indicating whether the current interpolation picture 400 corresponds to a reconstructed current picture; when the first information indicates that the current interpolation picture 400 does not correspond to a reconstructed current picture, generating second information indicating whether the current interpolation block 430 is used to reconstruct the current block 350; and generating a bitstream including the first information and the second information.

In an embodiment of the disclosure, the first information may be included in a bitstream for the current picture 300, and the second information may be included in a bitstream for the current block 350.

The interpolation block generator 1612 of the image encoding apparatus 1600 according to an embodiment of the disclosure may obtain a motion vector of at least one temporal neighboring block for the current interpolation block 430 from at least one of the first reference picture 500 or the second reference picture 600.

The interpolation block generator 1612 of the image encoding apparatus 1600 according to an embodiment of the disclosure may derive one or more motion vector candidates from the motion vector of the at least one temporal neighboring block.

In an embodiment of the disclosure, each of the one or more motion vector candidates may include a first motion vector for indicating a block within the first reference picture 500 and a second motion vector for indicating a block within the second reference picture 600.

The interpolation block generator 1612 of the image encoding apparatus 1600 according to an embodiment of the disclosure may select a motion vector candidate for the current interpolation block 430 from among the one or more motion vector candidates.

The interpolation block generator 1612 of the image encoding apparatus 1600 according to an embodiment of the disclosure may generate the current interpolation block 430 using a first block within the first reference picture 500 indicated by a first motion vector of the selected motion vector candidate and a second block within the second reference picture 600 indicated by a second motion vector of the selected motion vector candidate.

The encoder 1614 of the image encoding apparatus 1600 according to an embodiment of the disclosure may encode the current block 350 using the current interpolation block 430.

A recording medium according to an embodiment of the disclosure may include a bitstream, and the bitstream may include an encoding result of the current block 350.

In an embodiment of the disclosure, the encoding result of the current block 350 may be obtained by obtaining a motion vector of at least one temporal neighboring block for the current interpolation block 430 from at least one of the first reference picture 500 or the second reference picture 600.

In an embodiment of the disclosure, the result of encoding the current block 350 may be obtained by deriving one or more motion vector candidates from the motion vector of the at least one temporal neighboring block.

In an embodiment of the disclosure, each of the one or more motion vector candidates may include a first motion vector for indicating a block within the first reference picture 500 and a second motion vector for indicating a block within the second reference picture 600.

In an embodiment of the disclosure, the result of encoding the current block 350 may be obtained by selecting a motion vector candidate for the current interpolation block 430 from among the one or more motion vector candidates.

In an embodiment of the disclosure, the result of encoding the current block 350 may be obtained by generating the current interpolation block 430 using a first block within the first reference picture 500 indicated by a first motion vector of the selected motion vector candidate and a second block within the second reference picture 600 indicated by a second motion vector of the selected motion vector candidate.

In an embodiment of the disclosure, the result of encoding the current block 350 may be obtained by encoding the current block 350 using the current interpolation block 430.

The image encoding method and apparatus and the image decoding method and apparatus according to an embodiment of the disclosure may reduce the number of motion information requiring signaling to reconstruct the current block 350.

The image encoding method and apparatus and the image decoding method and apparatus according to an embodiment of the disclosure may generate an interpolation block suitable to reconstruct the current block 350.

The image encoding method and apparatus and the image decoding method and apparatus according to an embodiment of the disclosure may reduce a bit rate of a bitstream.

An embodiment of the disclosure may be provided as a computer-executable program, and the program may be stored in a machine-readable storage medium.

The machine-readable storage medium may be provided as a non-transitory storage medium. Here, "non-transitory" means that the storage medium does not include a signal (e.g., an electromagnetic wave) and is tangible, but does not distinguish whether data is stored semi-permanently or temporarily in the storage medium. For example, the "non-transitory storage medium" may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in the form of a machine-readable storage medium (e.g., a CD-ROM), or distributed (e.g., downloaded or uploaded) online via an application store or between two user devices (e.g., smartphones) directly. When distributed online, at least part of the computer program product (e.g., a downloadable application) may be temporarily generated or at least temporarily stored in a machine-readable storage medium, such as a memory of a server of a manufacturer, a server of an application store, or a relay server.

Although some particular embodiments are described above, the scope of the disclosure is not limited to these particular embodiments, and various modifications and changes may be made by one of ordinary skill in the art without departing from the scope of the disclosure.

The invention claimed is:

1. An image decoding method comprising:

obtaining a motion vector of at least one temporal neighboring block included in at least one of a first reference picture and a second reference picture;

deriving one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture;

selecting a motion vector candidate for a current interpolation block from among the one or more motion vector candidates;

generating the current interpolation block using a first block within the first reference picture indicated by the first motion vector included in the selected motion vector candidate and a second block within the second reference picture indicated by the second motion vector included in the selected motion vector candidate; and reconstructing a current block using the current interpolation block.

2. The image decoding method of claim 1, wherein the at least one temporal neighboring block comprises a block located at a same position as the current interpolation block from among blocks included in the at least one of the first reference picture and the second reference picture, and a block adjacent to the block located at the same position.

3. The image decoding method of claim 1, wherein the selecting of the motion vector candidate for the current interpolation block is performed based on a difference value between a block within the first reference picture indicated by a first motion vector and a block within the second reference picture indicated by a second motion vector.

4. The image decoding method of claim 3, wherein a motion vector candidate having a smallest difference value from among the one or more motion vector candidates is selected.

5. The image decoding method of claim 3, wherein the selecting of the motion vector candidate for the current interpolation block comprises determining, according to a predetermined order, whether the difference value of each of the one or more motion vector candidates is less than a predetermined value, and wherein a first motion vector candidate that is identified as having the difference value less than the predetermined value is selected.

6. The image decoding method of claim 1, wherein the one or more motion vector candidates comprise a motion vector candidate that includes a first motion vector and a second motion vector of a neighboring interpolation block that is adjacent to the current interpolation block.

7. The image decoding method of claim 1, wherein the deriving of the one or more motion vector candidates comprises:

determining an availability of the at least one temporal neighboring block; and based on the at least one temporal neighboring block being unavailable, determining a first motion vector and a second motion vector for the current interpolation block using an alternative motion vector.

8. The image decoding method of claim 7, wherein the alternative motion vector comprises at least one from among a zero vector, a global vector set for a current interpolation picture comprising the current interpolation block, and a first motion vector and a second motion vector of a neighboring interpolation block adjacent to the current interpolation block.

9. The image decoding method of claim 1, wherein the deriving of the one or more motion vector candidates comprises:

deriving, from the motion vector of the at least one temporal neighboring block, the first motion vector based on a first picture order count (POC) difference between a picture indicated by the motion vector of the at least one temporal neighboring block and a reference picture comprising the at least one temporal neighboring block, and a second POC difference between a current picture and the first reference picture, and deriving, from the motion vector of the at least one temporal neighboring block, the second motion vector based on the first POC difference, and a third POC difference between the current picture and the second reference picture.

10. The image decoding method of claim 1, wherein a POC of the first reference picture is less than a POC of the current picture and has a smallest difference from the POC of the current picture from among pictures reconstructed before the current picture, and wherein a POC of the second reference picture is greater than the POC of the current picture and has a smallest difference from the POC of the current picture from among the pictures reconstructed before the current picture.

11. The image decoding method of claim 1, further comprising:

obtaining, from a bitstream, first information indicating whether a current interpolation picture comprising the current interpolation block corresponds to a reconstructed current picture;

based on the first information indicating that the current interpolation picture corresponds to the reconstructed current picture, generating the current interpolation picture comprising the current interpolation block using the first reference picture and the second reference picture; and determining the reconstructed current picture based on the current interpolation picture.

12. The image decoding method of claim 11, further comprising:

based on the first information indicating that the current interpolation picture does not correspond to the reconstructed current picture, obtaining, from the bitstream, second information indicating whether the current interpolation block is used to reconstruct the current block, and wherein based on the second information indicating that the current interpolation block is used, the current block is reconstructed using the current interpolation block.

13. The image decoding method of claim 12, wherein the first information is obtained from a bitstream for a current picture comprising the current block, and the second information is obtained from a bitstream for the current block.

14. An image decoding apparatus comprising:

an interpolation block generator configured to obtain a motion vector of at least one temporal neighboring block included in at least one of a first reference picture and a second reference picture, derive one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture, select a motion vector candidate for a current interpolation block from among the one or more motion vector candidates, and generate the current interpolation block using a first block within the first reference picture indicated by the first motion vector included in the selected motion vector candidate and a second block within the second reference picture indicated by the second motion vector included in the selected motion vector candidate; and a reconstructor configured to reconstruct a current block using the current interpolation block.

15. An image encoding method comprising:

obtaining a motion vector of at least one temporal neighboring block for a current interpolation block from at least one of a first reference picture or a second reference picture;

deriving one or more motion vector candidates from the motion vector of the at least one temporal neighboring block, wherein each motion vector candidate of the one or more motion vector candidates includes a first motion vector indicating a block within the first reference picture and a second motion vector indicating a block within the second reference picture;

selecting a motion vector candidate for the current interpolation block from among the one or more motion vector candidates;

generating the current interpolation block using a first block within the first reference picture indicated by the first motion vector included in the selected motion vector candidate and a second block within the second reference picture indicated by the second motion vector included in the selected motion vector candidate; and encoding a current block using the current interpolation block.

16. The image encoding method of claim 15, wherein the obtaining of the motion vector of the at least one temporal neighboring block comprises determining, as the at least one temporal neighboring block, a block located at a same position as the current interpolation block from among blocks included in the at least one of the first reference picture and the second reference picture, and a block adjacent to the block located at the same position.

17. The image encoding method of claim 15, further comprising:

generating first information indicating whether a current interpolation picture comprising the current interpolation block corresponds to a reconstructed current picture;

based on the first information indicating that the current interpolation picture does not correspond to the reconstructed current picture, generating second information indicating whether the current interpolation block is used to reconstruct the current block; and generating a bitstream comprising the first information and the second information.

18. The image encoding method of claim 17, wherein the first information is included in a bitstream for a current picture, and the second information is included in a bitstream for the current block.

19. An image encoding apparatus comprising:

an interpolation block generator configured to:

obtain a motion vector of at least one temporal neighboring block for a current interpolation block from at least one of a first reference picture or a second reference picture, derive one or more motion vector candidates from the motion vector of the at least one temporal neighboring block, wherein each of the one or more motion vector candidates includes a first motion vector indicating a block within the first reference picture and a second motion vector indicating a block within the second reference picture, select a motion vector candidate for the current interpolation block from among the one or more motion vector candidates, and generate the current interpolation block using a first block within the first reference picture indicated by the first motion vector included in the selected motion vector candidate and a second block within the second reference picture indicated by the second motion vector included in the selected motion vector candidate; and an encoder configured to encode a current block using the current interpolation block.

20. A non-transitory computer-readable medium storing a bitstream, the bitstream comprising an encoding result of a current block, wherein the encoding result of the current block is generated by:

obtaining a motion vector of at least one temporal neighboring block for a current interpolation block from at least one of a first reference picture or a second reference picture, deriving one or more motion vector candidates from the motion vector of the at least one temporal neighboring block, wherein each of the one or more motion vector candidates includes a first motion vector indicating a block within the first reference picture and a second motion vector indicating a block within the second reference picture, selecting a motion vector candidate for the current interpolation block from among the one or more motion vector candidates, generating the current interpolation block using a first block within the first reference picture indicated by the first motion vector included in the selected motion vector candidate and a second block within the second reference picture indicated by the second motion vector included in the selected motion vector candidate, and encoding a current block using the current interpolation block.

* * * * *